(12) United States Patent
Zhao

(10) Patent No.: US 11,166,190 B2
(45) Date of Patent: Nov. 2, 2021

(54) BUFFER STATE REPORTING METHOD, USER EQUIPMENT, METHOD OF PROCESSING BUFFER STATE REPORT AND NETWORK SIDE DEVICE

(71) Applicant: CHINA ACADEMY OF TELECOMMUNICATIONS TECHNOLOGY, Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 44 days.

(21) Appl. No.: 16/497,437

(22) PCT Filed: Mar. 14, 2018

(86) PCT No.: PCT/CN2018/078992
§ 371 (c)(1),
(2) Date: Sep. 24, 2019

(87) PCT Pub. No.: WO2018/171480
PCT Pub. Date: Sep. 27, 2018

(65) Prior Publication Data
US 2020/0382988 A1 Dec. 3, 2020

(30) Foreign Application Priority Data

Mar. 24, 2017 (CN) .......................... 201710184584.6

(51) Int. Cl.
*H04W 28/02* (2009.01)

(52) U.S. Cl.
CPC ............................... *H04W 28/0278* (2013.01)

(58) Field of Classification Search
CPC . H04W 28/0278; H04W 76/15; H04W 24/08; H04W 28/04; H04W 36/0066;
(Continued)

(56) References Cited

U.S. PATENT DOCUMENTS

2014/0307663 A1 10/2014 Huang et al.
2015/0245349 A1 8/2015 Jha et al.
(Continued)

FOREIGN PATENT DOCUMENTS

| CN | 101483918 A | 7/2009 |
|---|---|---|
| CN | 103139918 A | 6/2013 |

(Continued)

OTHER PUBLICATIONS

Extended European Search Report from EP 18772164.2, dated Jan. 23, 2020.
(Continued)

*Primary Examiner* — Kashif Siddiqui
(74) *Attorney, Agent, or Firm* — Ladas & Parry, LLP

(57) ABSTRACT

A buffer state reporting method, a UE, a method of processing a buffer state report and a network side device are provided. The buffer state reporting method includes: determining, by the UE, whether a buffer state reporting triggering condition is met; and reporting, by the UE, buffer state information to a network side device if the buffer state reporting triggering condition is met, wherein buffer state information of a plurality of logical channels corresponding to a same bearer for which a data packet duplication mode is configured/activated are reported separately.

17 Claims, 6 Drawing Sheets

(58) Field of Classification Search
CPC ..... H04W 40/04; H04W 4/70; H04W 72/042; H04W 72/1284; H04W 80/02; H04L 1/08; H04L 45/14; H04L 45/24; H04L 69/324
See application file for complete search history.

(56) References Cited

U.S. PATENT DOCUMENTS

| | | | |
|---|---|---|---|
| 2016/0234714 | A1 | 8/2016 | Basu Mallick et al. |
| 2018/0270698 | A1* | 9/2018 | Babaei .............. H04W 28/0278 |
| 2018/0309660 | A1* | 10/2018 | Loehr ................... H04W 76/15 |
| 2019/0268799 | A1* | 8/2019 | Hong .................... H04W 40/04 |

FOREIGN PATENT DOCUMENTS

| | | |
|---|---|---|
| JP | 2016532327 A | 10/2016 |
| WO | 2016163686 A1 | 10/2016 |

OTHER PUBLICATIONS

First office action and search report mailed for Chinese Application No. CN201710184584.6 dated Dec. 24, 2018.
InterDigital Communications, "Packet Duplication at PDCP," 3GPP TSG-RAN WG2 Meeting #97, Feb. 13-17, 2017, pp. 1-2.
ASUSTeK, "Discussion on SR and BSR in NR," 3GPP TSG-RAN WG2 Meeting #97, Feb. 13-17, 2017, pp. 1-4.
LG Electronics Inc., "BSR enhancement for New RAT," 3GPP TSG-RAN WG2 Meeting #97, Feb. 13-17, 2017, pp. 1-2.
Qualcomm Incorporated, "Impact of PDCP Duplication on BSR Procedure," r3GPP TSG-RAN WG2 Meeting NR ad-hoc 2, Jun. 27-29, 2017, pp. 1-3.
Huawei, HiSilicon, "BSR procedure for data duplication," 3GPP TSG-RAN WG2 #101, Feb. 26, 2018 to Mar. 2, 2018, pp. 1-3.
Written Opinion mailed for International Application No. PCT/CN2018/078992 dated May 30, 2018.
International Search Report mailed for International Application No. PCT/CN2018/078992 dated May 30, 2018.
International Preliminary Report on Patentability mailed for International Application No. PCT/CN2018/078992 dated May 30, 2018.
"Packet duplication for URLLC in DC and CA deployment", R2-1700336, 3GPP TSG-RAN WG2 NR Ad-hoc, Spokane, Washington, USA, Jan. 17-19, 2017.
Notice of Reasons for Refusal from JP app. No. 2019-552449, dated Nov. 10, 2020, with English translation from Global Dossier.
Communication pursuant to Article 94(3) EPC from EP app. No. 18772164.2, dated Nov. 10, 2020.
Communication pursuant to Article 94(3) EPC for EP app. No. 18772164.2, dated Mar. 31, 2021.
"Data duplication in lower layers (HARQ)", Tdoc R2-1702032 (Revision of R2-1700833), 3GPP TSG-RAN WG2 #97, Athens, Greece, Feb. 13-17, 2017.

\* cited by examiner

| logical channel No. | PDCP data buffer amount | RLC data buffer amount 1 |
|---|---|---|
| logical channel No. | RLC data buffer amount 2 | |

Fig. 11

| logical channel No. | PDCP data buffer amount | RLC data buffer amount |
|---|---|---|

Fig. 12

| logical channel group 1 | data buffer amount | byte 1 |
|---|---|---|
| logical channel group 2 | data buffer amount | byte 2 |
| logical channel group 3 | data buffer amount | byte 3 |
| logical channel group 4 | data buffer amount | byte 4 |

Fig. 13

| LCG ID | PDCP+ RLC data buffer amount |
|---|---|

Fig. 14

| LCG ID | PDCP data buffer amount | RLC data buffer amount |
|---|---|---|

BUFFER STATE REPORTING METHOD, USER EQUIPMENT, METHOD OF PROCESSING BUFFER STATE REPORT AND NETWORK SIDE DEVICE

CROSS-REFERENCE TO RELATED APPLICATIONS

The present application is the U.S. national phase of PCT/CN2018/078992 filed on Mar. 14, 2018 which claims a priority of to the Chinese patent application No. 201710184584.6 filed on Mar. 24, 2017, the disclosures of which are incorporated by reference herein in their entireties.

TECHNICAL FIELD

The present disclosure relates to the field of communication technology, in particular to a buffer state reporting method, a user equipment (UE), a method of processing a buffer state report and a network side device.

BACKGROUND

In order to support the high-reliability and low-latency service transmission requirements, a mechanism for Packet Data Convergence Protocol (PDCP) layer data packets duplication is introduced to New Radio (NR) in the next-generation mobile communication network (for example, 5G).

The uplink data transmission of the UE is scheduled by the network side. The network side determines the uplink resource allocation and notifies the UE the same by using an uplink scheduling grant (UL grant). The network side allocates uplink resource based on the amount of uplink data to be sent by the UE, that is, the buffer state of the UE. Since the buffer is arranged on the UE side and if the network side wants to know the information, the UE needs to perform a buffer state report (BSR) to the base station. However, there is no BSR method for a system that introduces the PDCP layer data packet duplication.

SUMMARY

An object of the present disclosure is to provide a buffer state reporting method, a UE, a method of processing a buffer state report and a network side device, so as to solve the problem in the related art that there is not a buffer state reporting method for a system that introduce the PCCP layer data packet duplication.

In one aspect, the present disclosure provides in some embodiments a buffer state reporting method, including: determining, by a user equipment (UE), whether a buffer state reporting triggering condition is met; and reporting, by the UE, buffer state information to a network side device if the buffer state reporting triggering condition is met, wherein buffer state information of a plurality of logical channels corresponding to a same bearer for which a data packet duplication mode is configured/activated are reported separately.

Optionally, the determining, by the UE, whether a buffer state report triggering condition is met includes: determining, by the UE, that the buffer state report triggering condition is met when the network side device configures/activates or deconfigures/deactivates the data packet duplication mode for at least one bearer of the UE; or determining, by the UE, that the buffer state reporting triggering condition is met when a buffer state difference of a plurality of logical channels corresponding to at least one bearer of the UE for which the data packet duplication mode is configured/activated exceeds a preset threshold.

Optionally, the reporting, by the UE, the buffer state information to the network side device includes: reporting, by the UE, buffer state information of all bearers for which the buffer state reporting (BSR) is necessary and corresponding to the UE to the network side device through a first BSR Media Access Control Control Element (MAC CE); or reporting, by the UE, buffer state information of all bearers for which the BRS is necessary and the data packet duplication mode is not configured/activated to the network side device by using a second BSR MAC CE; and reporting, by the UE, buffer state information of all bearers for which the BRS is necessary and the data packet duplication mode is configured/activated to the network side device by using a third BSR MAC CE.

Optionally, the reporting, by the UE, the buffer state information of all bearers corresponding to the UE to the network side device by using the first BSR MAC CE includes: reporting, by the UE, buffer state information to the network side device by taking a logical channel as a unit; or reporting, by the UE, buffer state information to the network side device by taking a logical channel group as a unit; or reporting, by the UE, buffer state information of one part of logic channels to the network side device by taking a logical channel as a unit, and buffer state information of the other parts of logic channels to the network side device by taking a logical channel group as a unit, wherein a plurality of logical channels corresponding to a same bearer for which the data packet duplication mode is configured/activated belong to different logical channel groups.

Optionally, the reporting, by the UE, the buffer state information to the network side device by taking a logical channel as a unit includes: reporting, by the UE, buffer data amount of each logical channel to the network side device by taking a logical channel as a unit, and the buffer data amount of each logical channel being a sum of a buffer data amount of a Packet Data Convergence Protocol (PDCP) layer and a buffer data amount of a Radio Link Control (RLC) layer corresponding to the logical channel; or reporting, by the UE, the buffer data amount of the PDCP layer and the buffer data amount of the RLC layer to the network side device separately by taking a logical channel as a unit; or for a logical channel corresponding to the bearer for which the data packet duplication mode is not configured/activated, reporting, by the UE, the buffer data amount of each logical channel to the network side device by taking a logical channel as a unit, and the buffer data amount of each logical channel being the sum of the buffer data amount of the PDCP layer and the buffer data amount of the RLC layer; for logical channels corresponding to the bearer for which the data packet duplication mode is configured/activated, reporting, by the UE, the buffer data amount of the PDCP layer and the buffer data amount of the RLC layer of each logical channel separately to the network side device by taking a logical channel as a unit.

Optionally, the reporting, by the UE, the buffer state information to the network side device by taking a logical channel group as a unit includes: reporting, by the UE, a buffer data amount of each logical channel group to the network side device by taking a logical channel group as a unit, wherein a plurality of logical channels corresponding to a same bearer for which the data packet duplication mode is configured/activated belong to different logical channel groups; or reporting, by the UE, the buffer data amount of each logical channel group to the network side device by taking a logical channel group as a unit, wherein logical channels corresponding to the bearer for which the data packet duplication mode is not configured/activated and logic channels corresponding the bearer for which the data packet duplication mode is configured/activated belong to different logical channel groups, and different logical channels corresponding to a same bearer for which the data packet duplication mode is configured/activated belong to different logic channel groups.

Optionally, the reporting, by the UE, buffer state information of one part of the logical channels to the network side device by taking a logical channel as a unit, and reporting buffer state information of the other parts of logical channels to the network side device by taking a logical channel group as a unit, includes: reporting, by the UE, the buffer state information of the logical channel corresponding to the bearer for which the data packet duplication mode is not configured/activated and the buffer state information of one of the plurality of logical channels corresponding to the bearer for which the data packet duplication mode is configured/activated to the network side device by taking a logical channel group as a unit, and reporting, by the UE, buffer state information of other logical channels corresponding to the bearer for which the data packet duplication mode is configured/activated to the network side device by taking a logical channel as a unit; or reporting, by the UE, the buffer state information of the logical channel corresponding to the bearer for which the data packet duplication mode is not configured/activated to the network side device by taking a logical channel group as a unit, and reporting, by the UE, the buffer state information of the plurality of logical channels corresponding to the bearer for which the data packet duplication mode is configured/activated to the network side device by taking a logical channel as a unit.

Optionally, the reporting, by the UE, the buffer state information of the bearer for which the data packet duplication mode is configured/activated to the network side device by using the third BSR MAC CE, includes: reporting, by the UE, the buffer state information of the plurality of logical channels corresponding to the bearer for which the data packet duplication mode is configured/activated to the network side device by taking a logical channel and/or a logic channel group as a unit, wherein the plurality of logical channels corresponding to a same bearer for which the data packet duplication mode is configured/activated belong to different logical channel groups.

Optionally, when the UE reports the buffer state information to the network side device by taking a logical channel group as a unit, the UE reports the buffer data amount of each logical channel group to the network side device, wherein the buffer data amount of each logical channel is the sum of the buffer data amount of the PDCP layer and the buffer data amount of the RLC layer buffer of the logical channel group; or when the UE reports the buffer state information to the network side device by taking a logical channel group as a unit, the UE separately reports the buffer data amount of the PDCP layer and the buffer data amount of the RLC layer buffer of each logical channel group to the network side device.

Optionally, when the UE reports the buffer state information to the network side device by taking a logical channel as a unit, the UE reports the buffer data amount of each logical channel to the network side device, wherein the buffer data amount of each logical channel is the sum of the buffer data amount of the PDCP layer buffer and the data amount of the RLC layer of the logic channel; or when the UE reports the buffer state information to the network side device by taking a logical channel as a unit, the UE separately reports the buffer data amount of the PDCP layer and the buffer data amount of the RLC layer of each logical channel to the network side device.

Optionally, the buffer data amount of the RLC layer of each of the plurality of logical channels corresponding to a same bearer for which the data packet duplication mode is configured/activated is a minimum of buffer data amount of the RLC layer of the plurality of logical channels corresponding to the bearer.

Optionally, the UE only reports the buffer data amount of one of the plurality of logical channels corresponding to the bearer for which the data packet duplication mode is configured/activated to the network side device.

Optionally, MAC sub-headers corresponding to the first BSR MAC CE, the second BSR MAC CE, and the third BSR MAC CE all carry a logical channel identifier (LCID) and/or length field indication information.

In another aspect, a method of processing a buffer state report includes: receiving, by a network side device, buffer state information from a user equipment (UE), and buffer state information of a plurality of logical channels corresponding to a same bearer for which a data packet duplication mode is configured/activated being separately reported; and scheduling, by the network side device, data of the plurality of logical channels corresponding to the same bearer for which the data packet duplication mode is configured/activated to different carriers respectively for transmission according to the buffer state information.

Optionally, the receiving, by the network side device, the buffer state information from the UE includes: receiving, by the network side device, buffer state information of all bearers for which buffer state reporting (BRS) is necessary from the UE by a first BSR Media Access Control Control Element (MAC CE); or receiving, by the network side device, buffer state information of all bearers for which the BSR is necessary and the data packet duplication mode is not configured/activated from UE by a second BSR MAC CE, and receiving, by the network side device, buffer state information of all bearers for which the BSR is necessary and the data packet duplication mode is configured/activated from UE by a third BSR MAC CE.

Optionally, the receiving, by the network side device, buffer state information of all bearers for which the BRS is necessary from the UE by a first BSR MAC CE includes: receiving, by the network side device, buffer state information reported by the UE by taking a logical channel as a unit; or receiving, by the network side device, buffer state information reported by the UE by taking a logical channel group as a unit; or receiving, by the network side device, buffer state information of one part of logical channels reported by the UE by taking a logical channel as a unit, and buffer state information of the other parts of logical channels reported by the UE by taking a logical channel group as a unit, wherein a plurality of logical channels corresponding to a same bearer for which the data packet duplication mode is configured/activated belong to different logical channel groups.

Optionally, the receiving, by the network side device, buffer state information from the UE by taking a logical channel as a unit includes: receiving, by the network side device, a buffer data amount of each logical channel reported by the UE by taking a logical channel as a unit, and the buffer data amount of each logical channel is a sum of a buffer data amount of a Packet Data Convergence Protocol (PDCP) layer and a buffer data amount of a Radio Link Control (RLC) layer corresponding to the logical channel; or receiving, by the network side device, the buffer data amount of the PDCP layer and the buffer data amount of the RLC layer of each logical channel separately reported by the UE by taking a logical channel as a unit; or for a logical channel corresponding to the bearer for which the data packet duplication mode is not configured/activated, receiving, by the network side device, the buffer data amount of each logical channel reported by the UE by taking a logical channel as a unit, and the buffer data amount of each logical channel being the sum of the buffer data amount of the PDCP layer and the buffer data amount of the RLC layer; for a plurality of logical channels corresponding to the bearer for which the data packet duplication mode is configured/activated, receiving, by the network side device, the buffer data amount of the PDCP layer and the buffer data amount of the RLC layer of each logical channel reported by the UE by taking a logical channel as a unit.

Optionally, the receiving, by the network side device, the buffer state information reported by the UE by taking a logical channel group as a unit includes: receiving, by the network side device, the buffer data amount of each logical channel group reported by the UE by taking a logical channel group as a unit, wherein the plurality of logical channels corresponding to a same bearer for which the data packet duplication mode is configured/activated belong to different logical channel groups; or receiving, by the network side device, the buffer data amount of each logical channel group reported by UE by taking a logical channel group as a unit, wherein logical channels corresponding to the bearer for which the data packet duplication mode is not configured/activated and logic channels corresponding the bearer for which the data packet duplication mode is configured/activated belong to different logical channel groups, and different logical channels corresponding to a same bearer for which the data packet duplication mode is configured/activated belong to different logic channel groups.

Optionally, the receiving, by the network side device, buffer state information of one part of the logical channels reported by the UE by taking a logical channel as a unit, and buffer state information of the other parts of logical channels reported by the UE by taking a logical channel group as a unit, includes: receiving, by the network side device, buffer state information of the logical channel corresponding to the bearer for which the data packet duplication mode is not configured/activated and buffer state information of one of a plurality of logical channels corresponding to the bearer for which the data packet duplication mode is configured/activated reported by the UE by taking a logical channel group as a unit, and receiving, by the network side device, buffer state information of other logical channels corresponding to the bearer for which the data packet duplication mode is configured/activated reported by the UE by taking a logical channel as a unit; or receiving, by the network side device, the buffer state information of the logical channel corresponding to the bearer for which the data packet duplication mode is not configured/activated reported by the UE by taking a logical channel group as a unit, and receiving, by the network side device, buffer state information of a plurality of logical channels corresponding to the bearer for which the data packet duplication mode is configured/activated reported by the UE by taking a logical channel as a unit.

Optionally, the receiving, by the network side device, the buffer state information of the bearer for which the data packet duplication mode is configured/activated reported by the UE by using the third BSR MAC CE, includes: receiving, by the network side device, the buffer state information of a plurality of logical channels corresponding to the bearer for which the data packet duplication mode is configured/activated reported by the UE by taking a logical channel and/or a logic channel group as a unit, wherein the plurality of logical channels corresponding to a same bearer for which the data packet duplication mode is configured/activated belong to different logical channel groups.

Optionally, when the network side device receives the buffer state information reported by the UE by taking a logical channel group as a unit, the network side device receives the buffer data amount of each logical channel group from the UE, wherein the buffer data amount of each logical channel is the sum of the buffer data amount of the PDCP layer and the buffer data amount of the RLC layer buffer of the logical channel group; or when the network side device receives the buffer state information reported by the UE by taking a logical channel group as a unit, the network side device receives the buffer data amount of the PDCP layer and the buffer data amount of the RLC layer buffer of each logical channel group reported by the UE separately.

Optionally, when the network side device receives the buffer state information reported by the UE by taking a logical channel as a unit, the network side device receives the buffer data amount of each logical channel from the UE, wherein the buffer data amount of each logical channel is the sum of the buffer data amount of the PDCP layer and the buffer data amount of the RLC layer buffer of the logical channel group; or when the network side device receives the buffer state information reported by the UE by taking a logical channel as a unit, the network side device receives the buffer data amount of the PDCP layer and the buffer data amount of the RLC layer buffer of each logical channel group reported by the UE separately.

Optionally, MAC sub-headers corresponding to the first BSR MAC CE, the second BSR MAC CE, and the third BSR MAC CE all carry a logical channel identifier (LCID) and/or length field indication information.

Optionally, the method further includes: configuring, by the network side device, a mapping relationship between the logical channel and the carrier for the UE.

In yet another aspect, a user equipment (UE) includes: a determining module, configured to determine whether a buffer state reporting triggering condition is met; and a reporting module, configured to report buffer state information to a network side device if the buffer state reporting triggering condition is met, wherein buffer state information of a plurality of logical channels corresponding to a same bearer for which a data packet duplication mode is configured/activated are reported separately.

Optionally, the determining module determines whether the buffer state report triggering condition is met includes: determining, by the determining module, that the buffer state report triggering condition is met when the network side device configures/activates or deconfigures/deactivates a data packet duplication mode for at least one bearer of the UE; or determining, by the determining module, that the buffer state reporting triggering condition is met when a buffer state difference of a plurality of logical channels corresponding to the at least one bearer of the UE for which the data packet duplication mode is configured/activated exceeds a preset threshold.

Optionally, the reporting module is configured to report buffer state information of all bearers for which buffer state reporting (BSR) is necessary and corresponding to the UE to the network side device by using a first BSR Media Access Control Control Element (MAC CE); or report buffer state information of all bearers for which the BRS is necessary and the data packet duplication mode is not configured/activated to the network side device by using a second BSR MAC CE; and report buffer state information of all bearers for which the BRS is necessary and the data packet duplication mode is configured/activated to the network side device by using a third BSR MAC CE.

Optionally, the reporting module reports to the network side device the buffer state information of all the bearers for which BSR is necessary by using the first BSR MAC CE includes: reporting buffer state information to the network side device by taking a logical channel as a unit; or reporting buffer state information to the network side device by taking a logical channel group as a unit; or reporting buffer state information of one part of logic channels to the network side device by taking a logical channel as a unit, and buffer state information of the other parts of logic channels to the network side device by taking a logical channel group as a unit, wherein a plurality of logical channels corresponding to a same bearer for which the data packet duplication mode is configured/activated belong to different logical channel groups.

Optionally, the reporting module reports the buffer state information to the network side device by taking a logical channel as a unit includes: reporting the buffer data amount of each logical channel to the network side device by taking a logical channel as a unit, and the buffer data amount of each logical channel being the sum of a buffer data amount of a Packet Data Convergence Protocol (PDCP) layer and a buffer data amount of a Radio Link Control (RLC) layer corresponding to the logical channel; or reporting the buffer data amount of the PDCP layer and the buffer data amount of the RLC layer to the network side device separately by taking a logical channel as a unit; or for a logical channel corresponding to the bearer for which the data packet duplication mode is not configured/activated, reporting, by the reporting module, the buffer data amount of each logical channel to the network side device by taking a logical channel as a unit, and the buffer data amount of each logical channel being the sum of the buffer data amount of the PDCP layer and the buffer data amount of the RLC layer; for a plurality of logical channels corresponding to the bearer for which the data packet duplication mode is configured/activated, reporting, by the reporting module, the buffer data amount of the PDCP layer and the buffer data amount of the RLC layer of each logical channel respectively to the network side device by taking a logical channel as a unit.

Optionally, the reporting module reports the buffer state information to the network side device by taking a logical channel group as a unit includes: reporting the buffer data amount of each logical channel group to the network side device by taking a logical channel group as a unit, wherein a plurality of logical channels corresponding to a same bearer for which the data packet duplication mode is configured/activated belong to different logical channel groups; or reporting, the buffer data amount of each logical channel group to the network side device by taking a logical channel group as a unit, wherein the logical channel corresponding to the bearer for which the data packet duplication mode is not configured/activated and the logic channel corresponding the bearer for which the data packet duplication mode is configured/activated belong to different logical channel groups, and different logical channels corresponding to a same bearer for which the data packet duplication mode is configured/activated belong to different logic channel groups.

Optionally, the reporting module reports buffer state information of one part of the logical channels to the network side device by taking a logical channel as a unit, and reports buffer state information of the other parts of logical channels to the network side device by taking a logical channel group as a unit includes: reporting the buffer state information of the logical channel corresponding to the bearer for which the data packet duplication mode is not configured/activated and the buffer state information of one of the plurality of logical channels corresponding to the bearer for which the data packet duplication mode is configured/activated to the network side device by taking a logical channel group as a unit, and reporting buffer state information of other logical channels corresponding to the bearer for which the data packet duplication mode is configured/activated to the network side device by taking a logical channel as a unit; or reporting the buffer state information of the logical channel corresponding to the bearer for which the data packet duplication mode is not configured/activated to the network side device by taking a logical channel group as a unit, and reporting buffer state information of a plurality of logical channels corresponding to the bearer for which the data packet duplication mode is configured/activated to the network side device by taking a logical channel as a unit.

Optionally, the reporting module reports the buffer state information of the bearer for which the data packet duplication mode is configured/activated to the network side device by using the third BSR MAC CE includes: reporting the buffer state information of a plurality of logical channels corresponding to the bearer for which the data packet duplication mode is configured/activated to the network side device by taking a logical channel and/or a logic channel group as a unit, wherein the plurality of logical channels corresponding to a same bearer for which the data packet duplication mode is configured/activated belong to different logical channel groups.

Optionally, when the reporting module reports the buffer state information to the network side device by taking a logical channel group as a unit, the reporting module reports the buffer data amount of each logical channel group to the network side device, wherein the buffer data amount of each logical channel is the sum of the buffer data amount of the PDCP layer and the buffer data amount of the RLC layer buffer of the logical channel group; or when the reporting module reports the buffer state information to the network side device by taking a logical channel group as a unit, the reporting module separately reports the buffer data amount of the PDCP layer and the buffer data amount of the RLC layer buffer of each logical channel group to the network side device.

Optionally, when the reporting module reports the buffer state information to the network side device by taking a logical channel as a unit, the reporting module reports the buffer data amount of each logical channel to the network side device, wherein the buffer data amount of each logical channel is the sum of the buffer data amount of the PDCP layer buffer and the data amount of the RLC layer of the logic channel; or when the reporting module reports the buffer state information to the network side device by taking a logical channel as a unit, the reporting module separately reports the buffer data amount of the PDCP layer and the buffer data amount of the RLC layer of each logical channel to the network side device.

Optionally, the buffer data amount of the RLC layer of each of the plurality of logical channels corresponding to a same bearer for which the data packet duplication mode is configured/activated is a minimum of the buffer data amount of the RLC layer of the plurality of logical channels corresponding to the bearer.

Optionally, the reporting module only reports the buffer data amount of one of the logical channels corresponding to a same bearer for which the data packet duplication mode is configured/activated to the network side device.

Optionally, MAC sub-headers corresponding to the first BSR MAC CE, the second BSR MAC CE, and the third BSR MAC CE all carry a logical channel identifier (LCID) and/or length field indication information.

In yet another aspect, a network side device includes: a receiving module, configured to receive buffer state information from a user equipment (UE), and the buffer state information of a plurality of logical channels corresponding to a same bearer for which the data packet duplication mode is configured/activated being separately reported; and a scheduling module, configured to schedule data of the plurality of logical channels corresponding to the same bearer for which the data packet duplication mode is configured/activated to different carriers separately for transmission according to the buffer state information.

Optionally, the receiving module is configured to receive the buffer state information of all bearers for which buffer state reporting (BRS) is necessary from a user equipment (UE) by using a first BSR Media Access Control Control Element (MAC CE); or receive buffer state information of all bearers for which the BSR is necessary and the data packet duplication mode is not configured/activated from UE by using a second BSR MAC CE, and receive buffer state information of all bearers for which the BSR is necessary and the data packet duplication mode is configured/activated from UE by using a third BSR MAC CE.

Optionally, the receiving module is configured to receive the buffer state information of all bearers for which the BRS is necessary from the UE by using a first BSR MAC CE includes: receive buffer state information reported by the UE by taking a logical channel as a unit; or receive buffer state information reported by the UE by taking a logical channel group as a unit; or receive buffer state information of one part of logical channels reported by the UE by taking a logical channel as a unit, and buffer state information of the other parts of logical channels reported by taking a logical channel group as a unit, wherein a plurality of logical channels corresponding to a same bearer for which the data packet duplication mode is configured/activated belong to different logical channel groups.

Optionally, the receiving module receives buffer state information from the UE by taking a logical channel as a unit includes: receiving a buffer data amount of each logical channel that is reported by the UE by taking a logical channel as a unit, and the buffer data amount of each logical channel is a sum of a buffer data amount of a Packet Data Convergence Protocol (PDCP) layer and a buffer data amount of a Radio Link Control (RLC) layer corresponding to the logical channel; or receiving the buffer data amount of the PDCP layer and the buffer data amount of the RLC layer of each logical channel separately reported by the UE by taking a logical channel as a unit; or for a logical channel corresponding to the bearer for which the data packet duplication mode is not configured/activated, receiving, by the receiving module, the buffer data amount of each logical channel reported by the UE by taking a logical channel as a unit, and the buffer data amount of each logical channel being the sum of the buffer data amount of the PDCP layer and the buffer data amount of the RLC layer; for a plurality of logical channels corresponding to the bearer for which the data packet duplication mode is configured/activated, receiving, by the receiving module, the buffer data amount of the PDCP layer and the buffer data amount of the RLC layer of each logical channel reported by the UE by taking a logical channel as a unit.

Optionally, the receiving module receives buffer state information from the UE by taking a logical channel group as a unit includes: receiving the buffer data amount of each logical channel group reported by the UE by taking a logical channel group as a unit, wherein the plurality of logical channels corresponding to a same bearer for which the data packet duplication mode is configured/activated belong to different logical channel groups; or receiving the buffer data amount of each logical channel group reported by UE by taking a logical channel group as a unit, wherein logical channels corresponding to the bearer for which the data packet duplication mode is not configured/activated and logic channels corresponding the bearer for which the data packet duplication mode is configured/activated belong to different logical channel groups, and different logical channels corresponding to a same bearer for which the data packet duplication mode is configured/activated belong to different logic channel groups.

Optionally, the receiving module receives buffer state information of one part of the logical channels reported by the UE by taking a logical channel as a unit, and buffer state information of the other parts of logical channels reported by the UE by taking a logical channel group as a unit includes: receiving the buffer state information of the logical channel corresponding to the bearer for which the data packet duplication mode is not configured/activated and the buffer state information of one of the plurality of logical channels corresponding to the bearer for which the data packet duplication mode is configured/activated reported by the UE by taking a logical channel group as a unit, and receiving buffer state information of other logical channels corresponding to the bearer for which the data packet duplication mode is configured/activated reported by the UE by taking a logical channel as a unit; or receiving the buffer state information of the logical channel corresponding to the bearer for which the data packet duplication mode is not configured/activated reported by the UE by taking a logical channel group as a unit, and receiving buffer state information of a plurality of logical channels corresponding to the bearer for which the data packet duplication mode is configured/activated reported by the UE by taking a logical channel as a unit.

Optionally, the receiving module receives the buffer state information of the bearer for which the data packet duplication mode is configured/activated reported by the UE by using the third BSR MAC CE includes: receiving the buffer state information of a plurality of logical channels corresponding to the bearer for which the data packet duplication mode is configured/activated reported by the UE by taking a logical channel and/or a logic channel group as a unit, wherein the plurality of logical channels corresponding to a same bearer for which the data packet duplication mode is configured/activated belong to different logical channel groups.

Optionally, when the receiving module receives the buffer state information reported by the UE by taking a logical channel group as a unit, the receiving module receives the buffer data amount of each logical channel group from the UE, wherein the buffer data amount of each logical channel is the sum of the buffer data amount of the PDCP layer and the buffer data amount of the RLC layer buffer of the logical channel group; or when the receiving module receives the buffer state information reported by the UE by taking a logical channel group as a unit, the receiving module receives the buffer data amount of the PDCP layer and the buffer data amount of the RLC layer buffer of each logical channel group reported by the UE separately.

Optionally, when the receiving module receives the buffer state information reported by the UE by taking a logical channel as a unit, the receiving module receives the buffer data amount of each logical channel from the UE, wherein the buffer data amount of each logical channel is the sum of the buffer data amount of the PDCP layer and the buffer data amount of the RLC layer buffer of the logical channel group; or when the receiving module receives the buffer state information reported by the UE by taking a logical channel as a unit, the receiving module receives the buffer data amount of the PDCP layer and the buffer data amount of the RLC layer buffer of each logical channel reported by the UE separately.

Optionally, MAC sub-headers corresponding to the first BSR MAC CE, the second BSR MAC CE, and the third BSR MAC CE respectively carry a logical channel identifier (LCID) and/or length field indication information.

Optionally, the scheduling module is further configured to configure a mapping relationship between the logical channel and the carrier for the UE.

In yet another aspect, a user equipment (UE) includes a processor, a memory, and one or more programs stored in the memory, wherein the processor is configured to read the one or more programs and perform the above buffer state reporting method.

In yet another aspect, a network side device includes a processor, a memory, and one or more programs stored in the memory, wherein the processor is configured to read the one or more programs and perform the method of processing a buffer state report.

In yet another aspect, a computer readable storage medium has stored therein one or more programs executable by a computer, the one or more programs are executed by the computer to perform the buffer state reporting method.

In yet another aspect, a computer readable storage medium has stored therein one or more programs executable by a computer, the one or more programs are executed by the computer to perform the method of processing the buffer state report.

The technical solutions in the present disclose have the following advantages.

In the BSR method provided by some embodiments of the present disclosure, the UE determines whether the buffer state reporting triggering condition is met; if the buffer state reporting triggering condition is met, the UE reports the buffer state information to the network side device. The buffer state information of a plurality of logical channels corresponding to a same bearer for which the data packet duplication mode is configured/activated are separately reported. In this way, the network side device can accurately know the data amount corresponding to the bearer for which the data packet duplication mode is configured/activated, so that the plurality of logical channels corresponding to the bearer are relatively accurately scheduled on different carriers, thereby improving the performance of resource allocation and avoiding insufficient resource allocation.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

FIG. 11 is still yet another schematic diagram showing contents in a BSR MAC CE according to some embodiments of the present disclosure;

FIG. 12 is still yet another schematic diagram showing contents in a BSR MAC CE according to some embodiments of the present disclosure;

FIG. 13 is still yet another schematic diagram showing contents in a BSR MAC CE according to some embodiments of the present disclosure;

FIG. 14 is still yet another schematic diagram showing contents in a BSR MAC CE according to some embodiments of the present disclosure;

FIG. 15 is still yet another schematic diagram showing contents in a BSR MAC CE according to some embodiments of the present disclosure;

DETAILED DESCRIPTION OF THE EMBODIMENTS

The technical problems, the technical solutions, and the advantages of the present disclosure will be more clearly described in conjunction with the accompanying drawings and specific embodiments.

A new air interface system of the next-generation communication system (such as 5G) mainly supports three types of services: enhanced mobile broadband (eMBB), massive machine type communication (mMTC), and Ultra-Reliable and Low Latency Communications (URLLC).

Figure 1:
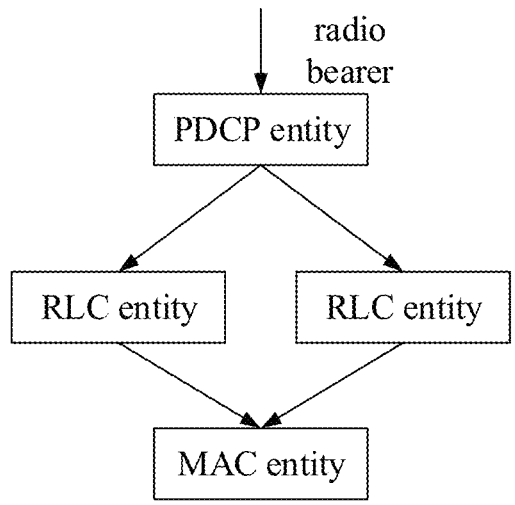
FIG. 1 is a schematic diagram showing a data packet duplication mode according to some embodiments of the present disclosure.

For URLLC, due to its high requirements for latency and reliability, a solution proposed by the 3rd Generation Partnership Project (3GPP) is to introduce PDCP layer data packets duplication, that is, the same PDCP layer data is transmitted through a plurality of paths, thereby improving transmission reliability and reducing transmission delay through a multiplex gain. FIG. 1 is a schematic diagram of a PDCP layer data packet duplication model according to some embodiments of the present disclosure. As shown in FIG. 1, a radio bearer of a PDCP layer (corresponding to a PDCP entity as shown in FIG. 1) is separately transmitted through two logical channels in a Radio Link Control (RLC) layer (each logical channel corresponds to one RLC entity in FIG. 1), and is processed by one Media Access Control (MAC) entity in the MAC layer, so as to map data from two RLC logical channels to different carriers for transmission. It should be noted that FIG. 1 only shows an example in which a bearer in a data packet duplication mode corresponds to two logical channels, but is not limited thereto. That is, a bearer in a data packet duplication mode may corresponds to a plurality of logical channels.

Based on the above application environment, the present disclosure provides a BSR method. The BSR method of the present disclosure will be described in detail below in conjunction with specific embodiments. In some embodiments of the present disclosure, the UE may be, for example, a mobile phone, a computer, a home appliance, a tablet personal computer, a laptop computer, a personal digital assistant (PDA), a Mobile Internet Device (MID) or a wearable device. It should be noted that the specific type of the UE is not limited herein. The network side device in some embodiments of the present disclosure may be an access network entity, such as a base station. A logical channel identifier or a logical channel group identifier is used to identify a logical channel or a logical channel group, such as a logical channel serial number or a logical channel group serial number.

Figure 2:
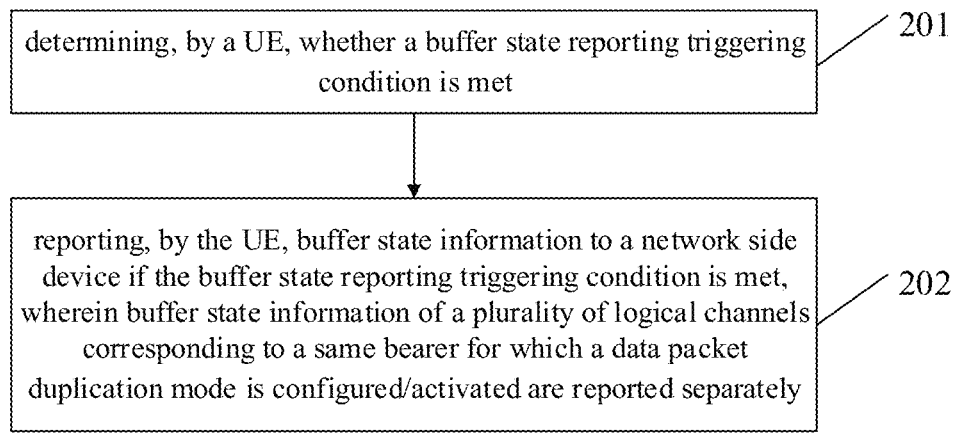
FIG. 2 is a schematic flowchart showing a buffer state reporting method according to some embodiments of the present disclosure.

FIG. 2 is a schematic flowchart of a buffer state reporting method according to some embodiments of the present disclosure. As shown in FIG. 2, the method includes the following steps.

Step 201: determining, by the UE, whether a buffer state reporting triggering condition is met.

Step 202: reporting, by the UE, buffer state information to a network side device if the buffer state reporting triggering condition is met, wherein buffer state information of a plurality of logical channels corresponding to a same bearer for which a data packet duplication mode is configured/activated are reported separately.

In some embodiments of the present disclosure, the UE determines whether the buffer state reporting triggering condition is met. If the buffer state reporting triggering condition is met, the UE may reports the buffer state information to the network side device by using a recently available UL grant (uplink scheduling grant). The buffer state reporting triggering condition may include a BSR triggering condition in a Long Term Evolution (LTE) system in the related art, and may also include a new triggering conditions based on the PDCP layer data packet duplication mode (collectively referring as the data packet duplication mode).

The new triggering condition may include that the network side device changes a state of the data packet duplication mode of at least one bearer of the UE. That is, in this case, when the network side device configures/activates or deconfigures/deactivates the data packet duplication mode of at least one bearer of the UE, the UE determines that the BSR triggering condition is met. The new triggering condition may also include that the buffer state difference of the plurality of logical channels corresponding to at least one bearer of the UE for which the data packet duplication mode is configured/activated exceeds a preset threshold. That is, when the buffer state difference of the plurality of logical channels corresponding to at least one bearer of the UE for which the data packet duplication mode is configured/activated exceeds the preset threshold, the UE determines that the BSR triggering condition is met.

Of course, it can be understood that the BSR triggering condition may include the BSR triggering condition in the LTE system and the new triggering condition based on the data packet duplication mode. This is not specifically limited herein.

When the UE meets the BSR triggering condition, the UE reports buffer state information to the network side device. In some embodiments of the present disclosure, the UE separately reports buffer state information of a plurality of logical channels corresponding to a same barrier for which the data packet duplication mode is configured/activated. The UE may report buffer state information to the network side device by using a BSR Media Access Control Control Element (MAC CE). The BSR MAC CE carries buffer state information of all bearers for which buffer state reporting is necessary. The UE may also report the buffer state information to the network side device by using two different BSR MAC CEs, where one BSR MAC CE carries buffer state information of all bearers for which the buffer state reporting is necessary and the data packet duplication mode is not configured/activated, and the other BSR MAC CE carries buffer state information of all bearers for which the buffer state reporting is necessary and the data packet duplication mode is configured/activated.

Figure 3:
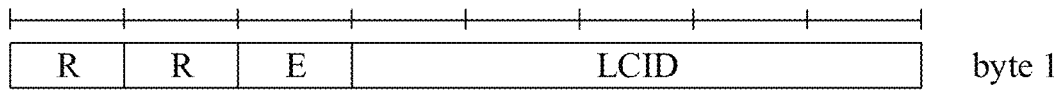
FIG. 3 is a schematic diagram showing a MAC sub-header according to some embodiments of the present disclosure.
Figure 4:
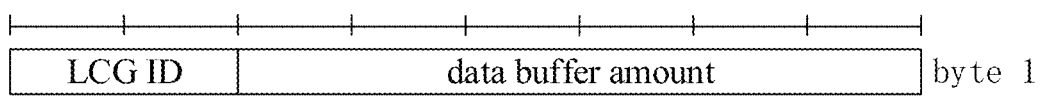
FIG. 4 is a schematic diagram showing a MAC CE format of a short BSR and a truncated BSR according to some embodiments of the present disclosure.
Figure 5:
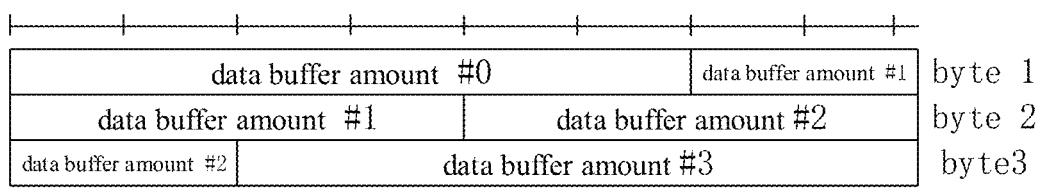
FIG. 5 is a schematic diagram showing a long BSR format according to some embodiments of the present disclosure.

The BSR MAC CE can be divided into a MAC sub-header and a MAC CE. The BSR MAC CE can be classified into a long BSR and a short BSR because the truncated BSR and the short BSR have the same format. FIG. 3 is a schematic diagram of a MAC sub-header according to some embodiments of the present disclosure, where "R" represents reserved bits and "E" represents extended bits, which may be used to indicate that the next byte is a MAC sub-header or a MAC load. LCID is a Logical Channel ID, which is used to identify a logical channel corresponding to the load portion. FIG. 4 is a MAC CE format of a short BSR and a truncated BSR according to some embodiments of the present disclosure. As shown in FIG. 4, the LCG ID is a Logical Channel Group ID, which is used to identify the logical channel group, the Buffer Size is the data buffer amount in the corresponding logical channel group. FIG. 5 is a schematic diagram of the long BSR format.

Because the length of the BSR MAC CE is not determined, in some embodiments of the present disclosure, when the UE reports the buffer state information to the network side device, the BSR MAC CE carries length field indication information which is used to indicate the length of the BSR MAC CE. The BSR MAC CE may also carry a logical channel identifier, and the logical channel identifier may be carried in the MAC sub-header or may be carried in the MAC CE, which is not specifically limited herein.

The UE may report the buffer state information to the network side device by only taking a logical channel as a unit, or may report the buffer state information to the network side device by only taking a logical channel group as a unit, and may also report the buffer state information to the network side device by the combination of taking a logical channel as a unit and taking a logic channel group as a unit. When the UE reports the buffer state information to the network side device by taking the logical channel group as a unit, the UE divides the plurality logical channels corresponding to a same bearer for which the data packet duplication mode is configured/activated into different logical channel groups and report the buffer state information. In other words, a plurality of logical channels corresponding to a same bearer for which the data packet duplication mode is configured/activated belong to different logical channel groups.

The UE may not distinguish between the PDCP layer and the RLC layer when reporting the buffer data amount to the network side device, that is, the UE may report the buffer data amount of each logical channel or logical channel group to the network side device. The buffer data amount of each logical channel or logical channel group is the sum of buffer data amount of the PDCP layer and buffer data amount of the RLC layer corresponding to the logical channel or logical channel group. The UE may also distinguish buffer data amount of the PDCP layer and buffer data amount of the RLC layer when reporting the buffer data amount to the network side device, that is, the UE may also separately report the buffer data amount of the PDCP layer and the buffer data amount of the RLC layer of each logical channel or logical channel to the network side device. In some embodiments of the present disclosure, the UE may partially distinguish between the buffer data amount of the PDCP layer and the buffer data mount of the RLC layer and partially not distinguish tween the PDCP layer and the RLC layer buffer data volume when reporting the buffer data amount to the network side device. For example, the UE may distinguish buffer data amount of PDCP layer and buffer data amount of the RLC layer only for the bearer having a configured/activated data packet duplication mode, and does not distinguish buffer data amount of the PDCP layer and buffer data amount of the RLC layer for the bearer for which the data packet duplication mode is not configured/activated.

In some embodiments of the present disclosure, when the UE reports the buffer state information to the network side device, for a plurality of logical channels corresponding to the same bearer for which the data packet duplication mode is configured/activated, the buffer data amount of RCL layer of each logic channel is the minimum value of the buffer data amount of the RLC layer of the plurality of logical channels corresponding to the bearer. In some embodiments of the present disclosure, the UE may also only report the buffer data amount of one of the logical channels to the network side.

It can be understood that, for a logical channel corresponding to the bearer for which the data packet duplication mode is not configured/activated, the UE may report the buffer data amount in a manner of taking the logic channel group as a unit in the LTE system, or may use other manners of taking the logic channel as a unit or the combination of taking the logic channel as a unit and taking the logic channel group as a unit, which is not limited herein.

The network side device receives the buffer state information reported by the UE, identifies a plurality of different logical channels corresponding to the bearer for which the data packet duplication mode is configured/activated, and schedule data in different logic channels corresponding to the same bearer for which the data packet duplication mode is configured/activated to different carriers and transmit these data. The network side device transmits a UL grant to the UE, and the UE receives the UL grant from the network side device, and performs a Logical Channel Prioritization (LCP) process according to the mapping relationship between the bearer and the carrier configured by the network side device.

Optionally, the determining, by the UE, whether a buffer state report triggering condition is met, includes: determining, by the UE, that the buffer state report triggering condition is met when the network side device configures/activates or deconfigures/deactivates the data packet duplication mode for at least one bearer of the UE; or determining, by the UE, that the buffer state reporting triggering condition is met when a buffer state difference of a plurality of logical channels corresponding to at least one bearer of the UE for which the data packet duplication mode is configured/activated exceeds a preset threshold.

In some embodiments of the present disclosure, the buffer state reporting condition includes a new reporting triggering condition based on the data packet duplication mode, that is, the buffer state reporting triggering condition may include that the network side device has changed the state of the data packet duplication mode of at least one bearer of the UE. That is, in some embodiments of the present disclosure, when the network side device configures/activates or deconfigures/deactivates the data packet duplication mode for at least one bearer of the UE, the UE determines that the BSR triggering condition is met. The BSR triggering condition may also include that the buffer state difference of the plurality of logical channels corresponding to at least one bearer of the UE for which the data packet duplication mode is configured/activated exceeds a preset threshold, that is, the UE determines that the BSR triggering condition is met when the buffer state difference of the plurality of logical channels corresponding to the at least one bearer of the UE for which the data packet duplication mode is configured/activated exceeds a preset threshold.

Optionally, the reporting, by the UE, the buffer state information to the network side device, includes: reporting, by the UE, buffer state information of all bearers for which the BSR is necessary and corresponding to the UE to the network side device through a first BSR MAC CE; or reporting, by the UE, buffer state information of all bearers for which the BRS is necessary and the data packet duplication mode is not configured/activated to the network side device by using a second BSR MAC CE; and reporting, by the UE, buffer state information of all bearers for which the BRS is necessary and the data packet duplication mode is configured/activated to the network side device by using a third BSR MAC CE.

In some embodiments of the present disclosure, when the UE meets the buffer state reporting triggering condition, the UE may transmit a piece of BSR MAC CE reporting buffer state information to the network side device, or may also transmit two pieces of BSR MAC CE reporting buffer state information to the network side device. Specifically, when the UE transmits a piece of BSR MAC CE reporting buffer state information to the network side device, the UE reports all the bearers for which the BSR is necessary and corresponding to the UE by using the first BSR MAC CE to the network side device. That is, the first BSR MAC CE carries buffer state information of all bearers for which the BSR is necessary and corresponding to the UE.

When the UE transmits two piece of BSR MAC CE reporting buffer state information to the network side device, the UE reports all the bearers for which the BSR is necessary and the data packet duplication mode is not configured/activated by using the second BSR MAC CE to the network side device, and the UE reports all the bearers for which the BSR is necessary and the data packet duplication mode is configured/activated by using the third BSR MAC CE to the network side device.

Optionally, the reporting, by the UE, the buffer state information of all bearers corresponding to the UE to the network side device by using the first BSR MAC CE includes: reporting, by the UE, buffer state information to the network side device by taking a logical channel as a unit; or reporting, by the UE, buffer state information to the network side device by taking a logical channel group as a unit; or reporting, by the UE, buffer state information of one part of logic channels to the network side device by taking a logical channel as a unit, and buffer state information of the other parts of logic channels to the network side device by taking a logical channel group as a unit, where a plurality of logical channels corresponding to a same bearer for which the data packet duplication mode is configured/activated belong to different logical channel groups.

In some embodiments of the present disclosure, the UE may report, to the network side device, buffer state information of all bearers for which the BSR is necessary by taking a logical channel as a unit. The UE may report, to the network side device, buffer state information of all bearers for which the BSR is necessary by taking a logical channel group as a unit. The UE may report, to the network side device, buffer state information of all bearers for which the BSR is necessary by the combination of taking a logical channel as a unit and taking a logical channel group as a unit.

Figure 6:
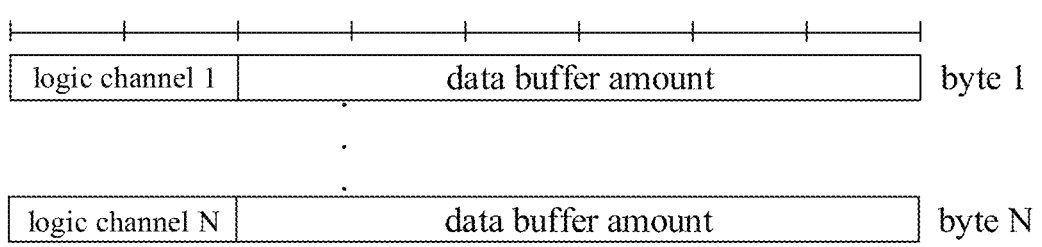
FIG. 6 is a schematic diagram showing contents in a BSR MAC CE according to some embodiments of the present disclosure.

When the UE reports the buffer state information of all bearers for which the BSR is necessary to the network side device by taking a logical channel as a unit, the UE transmits the buffer state information of each logical channel to the network side device. FIG. 6 is a schematic diagram of content of a BSR MAC CE according to some embodiments of the present disclosure. As shown in FIG. 6, when the UE reports buffer state information to the network side device by taking a logical channel as a unit. One byte of the BSR MAC CE carries buffer state information of one logical channel (such as the Buffer Size shown in FIG. 6). In the embodiment of the present disclosure, each byte also carries identifier of each logical channel. It should be noted that all BSR MAC CE schematic diagrams provided by some embodiments of the present disclosure are exemplified by the UE supporting a maximum of 4 logical channels or 4 logical channel groups, but are not limited thereto. When the number of logical channels or logical channel groups supported by the UE increases, the number of bits occupied by the logical channel identifier or the logical channel group identifier in BSR MAC CE increases accordingly.

The buffer state information of the one logical channel may distinguish the PDCP layer and the RLC layer, or may not distinguish between the PDCP layer and the RLC layer, and may also partially distinguish the PDCP layer and the RLC layer, and partially not distinguish the PDCP layer and the RLC layer. That is, the buffer state information of the one logical channel may be the sum of buffer data amount of the PDCP layer of the logical channel and buffer data amount of the RLC layer of the logical channel, or may be the buffer data amount of the PDCP layer or buffer data amount of the RLC layer, respectively. The UE may further distinguish the PDCP layer and the RLC layer for a plurality of logical channels corresponding to the bearer for which the data packet duplication mode is configured/activated, and may not distinguish the PDCP layer and the RLC layer for a plurality of logical channels corresponding to the bearer for which the data packet duplication mode is not configured/activated, which is not limited herein.

Figure 7:
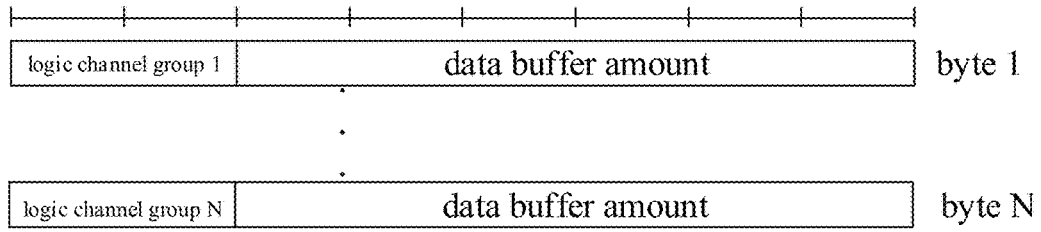
FIG. 7 is another schematic diagram showing contents in a BSR MAC CE according to some embodiments of the present disclosure.

When the UE reports buffer state information by taking a logical channel group as a unit to the network side device, the UE transmits buffer state information of each logical channel group to the network side device. FIG. 7 is another schematic diagram of content of BSR MAC CE according to some embodiments of the present disclosure. As shown in FIG. 7, when the UE reports buffer state information by taking a logical channel group as a unit to the network side device, one byte of the BSR MAC CE carries an identifier of a logical channel group and buffer state information of the logical channel group.

The UE may separately report the bearer for which the data packet duplication mode is not configured/activated and the bearer for which the data packet duplication mode is configured/activated by taking a logical channel group as a unit, or may report with a combination way. Logical channels corresponding to the bearer for which the data packet duplication mode is configured/activated and the logic channels corresponding to the bearer for which the data packet duplication mode is not configured/activated may belong to different logical channel groups, or may belong to a same logical channel group. It should be noted that, when the UE reports the buffer state information by taking a logical channel group as a unit, it is necessary to ensure that the plurality of logical channels corresponding to a same bearer for which the data packet duplication mode is configured/activated belong to different logical channel groups.

The buffer state information of the one logical channel group may distinguish the PDCP layer and the RLC layer, or may not distinguish between the PDCP layer and the RLC layer, and may also partially distinguish the PDCP layer and the RLC layer, and partially not distinguish the PDCP layer and the RLC layer. That is, the buffer state information of the one logical channel group may be the sum of buffer data amount of the PDCP layer of the logical channel group and buffer data amount of the RLC layer of the logical channel group, or may be the buffer data amount of the PDCP layer or buffer data amount of the RLC layer, respectively. The UE may further distinguish the PDCP layer and the RLC layer for a logical channel group including logic channels corresponding to the bearer for which data packet duplication mode is configured/activated, and may not distinguish the PDCP layer and the RLC layer for a logical channel group including logic channels corresponding to the bearer for which the data packet duplication mode is not configured/activated, which is not limited herein.

When the UE reports buffer state information of all bearers for which the BSR is necessary to the network side device in a combination manner of taking a logical channel as a unit and taking a logical channel group as a unit, the UE reports the buffer state information of a part of the logical channels to the network side device by taking a logic channel as a unit, and reports the buffer state information of the other logical channels to the network side device by taking a logical channel group as a unit. It should be noted that, in some embodiments of the present disclosure, it is necessary to ensure that the plurality of logical channels corresponding to a same bearer for which the data packet duplication mode is configured/activated belong to different logical channel groups.

Figure 8:
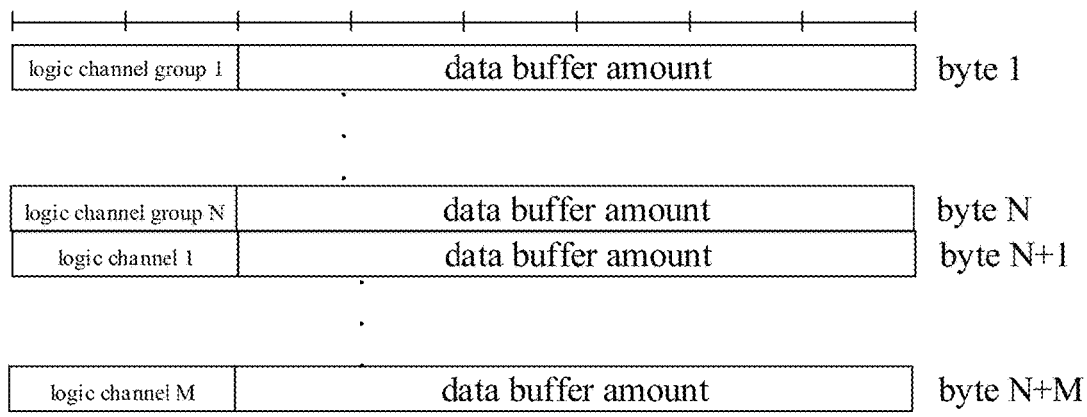
FIG. 8 is yet another schematic diagram showing contents in a BSR MAC CE according to some embodiments of the present disclosure.

FIG. 8 is another schematic diagram of content of BSR MAC CE according to some embodiments of the present disclosure. As shown in FIG. 8, some bytes of the BSR MAC CE (such as bytes 1-N, N is an integer greater than or equal to 1) carries the identifier of the logical channel group and the buffer state information of the logical channel group, and other bytes (such as byte N+1-N+M, M is an integer greater than or equal to 1) carrying an identifier of the logical channel and buffer state information of the logical channel.

In some embodiments of the present disclosure, the UE may report, to the network side device, buffer state information of a logical channel corresponding to a bearer for which the data packet duplication is not configured/activated mode and buffer state information of one of a plurality of logical channels corresponding to a bearer for which the data packet duplication mode is configured/activated by taking a logical channel group as a unit, and report, to the network side device, buffer state information of other logical channels corresponding to the bearer for which the data packet duplication is configured/activated by taking a logical channel as a unit. In some embodiments of the present disclosure, all or part of the logical channel groups in the logical channel groups identified by byte 1 to byte N in FIG. 8 include one of a plurality of logical channels corresponding to the bearer for which the data packet duplication mode is configured/activated. The logical channels identified by the byte N+1-N+M includes other logical channels corresponding to the bearer for which the data packet duplication mode is configured/activated. It should be noted that each logical channel group in the logical channel groups identified by bytes 1-N in FIG. 8 includes one logical channel of the plurality of logical channels corresponding to the bearer for which the data packet duplication mode is configured/activated. For example, if a UE supports a bearer A and a bearer B for which the data packet duplication mode are configured/activated, the logical channel group identified by a certain byte (for example, byte 1) in FIG. 8 may include one of the plurality of logical channels corresponding to the bearer A and one of the plurality of logical channels corresponding to the bearer B.

The UE may report the buffer state information of the logical channel corresponding to the bearer for which the data packet duplication mode is not configured/activated to the network side device by taking a logical channel group as a unit, and report the buffer state information of a plurality of logical channels corresponding to the bearer for which the data packet duplication mode is configured/activated to the network side device by taking a logical channel as a unit. In some embodiments of the present disclosure, the logical channel group identified by bytes 1-N in FIG. 8 includes only the logical channel corresponding to the bearer for which the data packet duplication mode is not configured/activated, the logical channels identified by bytes N+1-N+M includes a plurality of logical channels corresponding to all bearers for which the data packet duplication mode is configured/activated.

Optionally, the reporting, by the UE, the buffer state information to the network side device by taking a logical channel as a unit includes: reporting, by the UE, the buffer data amount of each logical channel to the network side device by taking a logical channel as a unit, and the buffer data amount of each logical channel being the sum of the buffer data amount of the PDCP layer and the buffer data amount of the RLC layer corresponding to the logical channel; or reporting, by the UE, the buffer data amount of the PDCP layer and the buffer data amount of the RLC layer to the network side device separately by taking a logical channel as a unit; or for the logical channel corresponding to the bearer for which the data packet duplication mode is not configured/activated, reporting, by the UE, the buffer data amount of each logical channel to the network side device by taking a logical channel as a unit, and the buffer data amount of each logical channel being the sum of the buffer data amount of the PDCP layer and the buffer data amount of the RLC layer; for the logical channel corresponding to the bearer for which the data packet duplication mode is configured/activated, reporting, by the UE, the buffer data amount of the PDCP layer and the buffer data amount of the RLC layer of each logical channel separately to the network side device by taking a logical channel as a unit.

In some embodiments of the present disclosure, when the UE reports buffer state information to the network side device by taking a logical channel as a unit, UE may distinguish the PDCP layer and the RLC layer, or may not distinguish the PDCP layer and the RLC layer, and may also partially distinguish the PDCP layer and the RLC layer, and may not partially distinguish the PDCP layer and the RLC layer.

Figure 9:
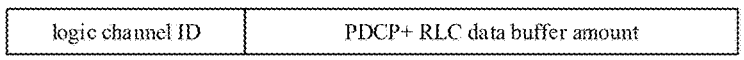
FIG. 9 is still yet another schematic diagram showing contents in a BSR MAC CE according to some embodiments of the present disclosure.

Specifically, the UE may report the buffer data amount of each logical channel to the network side device by taking a logical channel as a unit, where the buffer data amount of each logical channel is the sum of the buffer data mount of the PDCP layer and the buffer data amount of the RLC layer corresponding to the logical channel, as shown in FIG. 9.

Figure 10:
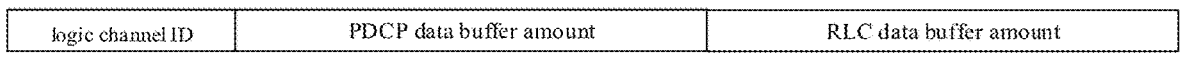
FIG. 10 is still yet another schematic diagram showing contents in a BSR MAC CE according to some embodiments of the present disclosure.

The UE may also separately report the buffer data mount of the PDCP layer and the buffer data amount of the RLC layer buffer of each logical channel to the network side device by taking a logical channel as a unit, as shown in FIG. 10.

The UE may also report the buffer data amount of each logical channel corresponding to the bearer for which the data packet duplication mode is not configured/activated to the network side device by taking a logical channel as a unit. The buffer data amount of each logic channel is the sum of the buffer data amount of the PDCP layer and the buffer data amount of the RLC layer. The UE may also separately report the buffer data amount of the PDCP layer and the buffer data amount of the RLC layer of each logical channel corresponding to the bearer for which the data packet duplication mode is configured/activated to the network side device by taking a logical channel as a unit, as shown in FIG. 11. It should be noted that, in some embodiments of the present disclosure, only the buffer data amount of the PDCP layer of one logic channel may be carried for a plurality logical channels corresponding to a same bear for which the data packet duplication mode is configured/activated. In addition, only a serial number of one logical channel and the buffer data amount of the RLC layer of one logic channel may be carried for a plurality logical channels corresponding to a same bear for which the data packet duplication mode is configured/activated, as shown in FIG. 12. Of course, the byte alignment may be considered to make appropriate adjustments or trade-offs when designing the MAC CE format.

Optionally, the reporting, by the UE, the buffer state information to the network side device by taking a logical channel group as a unit includes: reporting, by the UE, the buffer data amount of each logical channel group to the network side device by taking a logical channel group as a unit, where the plurality of logical channels corresponding to a same bearer for which the data packet duplication mode is configured/activated belong to different logical channel groups; or reporting, by the UE, the buffer data amount of each logical channel group to the network side device by taking a logical channel group as a unit, where the plurality of logical channels corresponding to the bearer for which the data packet duplication mode is not configured/activated and logic channels corresponding the bearer for which the data packet duplication mode is configured/activated belong to different logical channel groups, and different logical channels corresponding to a same bearer for which the data packet duplication mode is configured/activated belong to different logic channel groups.

In some embodiments of the present disclosure, the UE may separately report the bearer for which the data packet duplication mode is configured/activated and the bearer for which the data packet duplication mode is not configured/activated by taking a logical channel group as a unit, or may report them by a combination manner. That is, the logical channel corresponding to the bearer for which the data packet duplication mode is configured/activated and the logical channel corresponding to the bearer for which the data packet duplication mode is not configured/activated may belong to different logical channel groups respectively, or may belong to the same logical channel group. It should be noted that, when the UE reports the buffer state information by taking a logical channel group as a unit, it is necessary to ensure that a plurality of logical channels corresponding to the bearer for which the data packet duplication mode is configured/activated belong to different logical channel groups.

FIG. 13 is another schematic diagram of content of BSR MAC CE according to some embodiments of the present disclosure. As shown in FIG. 13, each byte of the BSR MAC CE (such as bytes 1-4) carries an identifier of one logical channel group and the buffer state information of the logical channel group.

In some embodiments of the present disclosure, the logical channel groups identified by all the bytes in the BSR MAC CE shown in FIG. 13 may include the logical channel corresponding to the bearer for which the data packet duplication mode is not configured/activated and the logic channel corresponding to the bearer for which the data packet duplication mode is configured/activated. In some embodiments of the present disclosure, the UE divided the logic channels into groups by distinguishing between bearers for which the data packet duplication mode is configured/activated and bearers for which the data packet duplication mode is not configured/activated. In the BSR MAC CE shown in FIG. 13, the logical channel group identified by some bytes (for example, byte 1, byte 2) includes only the logical channels corresponding to the bearer for which the data packet duplication mode is not configured/activated, and the logical channel group identified by other bytes (for example, byte 3, byte 4) includes only the logical channels corresponding to the bearer for which the data packet duplication mode is configured/activated.

Optionally, the reporting, by the UE, buffer state information of a part of the logical channels to the network side device by taking a logical channel as a unit, and reporting buffer state information of the other logical channels to the network side device by taking a logical channel group as a unit, includes: reporting, by the UE, the buffer state information of the logical channel corresponding to the bearer for which the data packet duplication mode is not configured/activated and the buffer state information of one of the plurality of logical channels corresponding to the bearer for which the data packet duplication mode is configured/activated to the network side device by taking a logical channel group as a unit, and reporting, by the UE, buffer state information of other logical channels corresponding to the bearer for which the data packet duplication mode is configured/activated to the network side device by taking a logical channel as a unit; or reporting, by the UE, the buffer state information of the logical channel corresponding to the bearer for which the data packet duplication mode is not configured/activated to the network side device by taking a logical channel group as a unit, and reporting, by the UE, buffer state information of a plurality of logical channels corresponding to the bearer for which the data packet duplication mode is configured/activated to the network side device by taking a logical channel as a unit.

Optionally, the reporting, by the UE, the buffer state information of the bearer for which the data packet duplication mode is configured/activated to the network side device by using the third BSR MAC CE, includes: reporting, by the UE, the buffer state information of a plurality of logical channels corresponding to the bearer for which the data packet duplication mode is configured/activated to the network side device by taking a logical channel and/or a logic channel group as a unit, where the plurality of logical channels corresponding to a same bearer for which the data packet duplication mode is configured/activated belong to different logical channel groups.

In some embodiments of the present disclosure, when the UE reports the buffer state information to the network side device by using two BSR MAC CEs, the third BSR MAC CE is used for reporting the buffer state information of the bearer for which the data packet duplication mode is configured/activated. Specifically, the third BSR MAC CE may be used for reporting by taking a logical channel and/or a logical channel group as a unit. That is, the third BSR MAC CE may be used for reporting the buffer state information of a plurality of logic channels corresponding to the bearer for which the data packet duplication mode is configured/activated by taking a logical channel as a unit, or reporting the buffer state information of a plurality of logic channels corresponding to the bearer for which the data packet duplication mode is configured/activated by taking a logical channel group as a unit, or reporting to the network side device by the combination of taking a logic channel as a unit and taking a logic channel group as a unit.

Optionally, when the UE reports the buffer state information to the network side device by taking a logical channel group as a unit, the UE reports the buffer data amount of each logical channel group to the network side device, where the buffer data amount of each logical channel is the sum of the buffer data amount of the PDCP layer and the buffer data amount of the RLC layer buffer of the logical channel group.

When the UE reports the buffer state information to the network side device by taking a logical channel group as a unit, the UE separately reports the buffer data amount of the PDCP layer and the buffer data amount of the RLC layer buffer of each logical channel group to the network side device.

In some embodiments of the present disclosure, when the buffer state information is reported to the network side device by taking a logical channel group as a unit, the PDCP layer and the RLC layer may be distinguished, and the PDCP layer and the RLC layer may not be distinguished.

Specifically, the UE may report the buffer data amount of each logical channel group to the network side device by taking a logical channel group as a unit, where the buffer data amount of each logical channel group is the sum of the buffer data amount of the PDCP layer and the buffer data amount of the RLC layer corresponding to the logic channel group, as shown in FIG. 14.

The UE may also separately report the buffer data amount of the PDCP layer and the buffer data amount of the RLC layer buffer of each logical channel group to the network side device by taking a logical channel group as a unit, as shown in FIG. 15.

Optionally, when the UE reports the buffer state information to the network side device by taking a logical channel as a unit, the UE reports the buffer data amount of each logical channel to the network side device, where the buffer data amount of each logical channel is the sum of the buffer data amount of the PDCP layer buffer and the data amount of the RLC layer of the logic channel; or when the UE reports the buffer state information to the network side device by taking a logical channel as a unit, the UE separately reports the buffer data amount of the PDCP layer and the buffer data amount of the RLC layer of each logical channel to the network side device.

Optionally, the buffer data amount of the RLC layer of each of the plurality of logical channels corresponding to a same bearer for which the data packet duplication mode is configured/activated is the minimum of the buffer data amount of the RLC layer of the plurality of logical channels corresponding to the bearer.

In some embodiments of the present disclosure, since the data transmitted by each of the plurality of logical channels corresponding to the bearer for which the data packet duplication mode is configured/activated is the same, the buffer data amount of the RLC layer of each logical channel is determined by taking the minimum value of the buffer data amount of the RCL layer of the plurality of logical channels corresponding to the bearer.

Optionally, the UE only reports the buffer data amount of one of the logical channels corresponding to the bearer for which the data packet duplication mode is configured/activated to the network side device.

In some embodiments of the present disclosure, since the data transmitted by each of the plurality of logical channels corresponding to the bearer for which the data packet duplication mode is configured/activated is the same, the buffer data amount of only one of the logical channels may be reported.

Optionally, MAC sub-headers corresponding to the first BSR MAC CE, the second BSR MAC CE, and the third BSR MAC CE all carry a logical channel identifier (LCID) and/or length field indication information.

In some embodiments of the present disclosure, the LCID and/or the length field indication information are both carried in a MAC sub-header of the BSR MAC CE.

In the BSR method provided by some embodiments of the present disclosure, the UE determines whether the buffer state reporting triggering condition is met; if the buffer state reporting triggering condition is met, the UE reports the buffer state information to the network side device. The buffer state information of a plurality of logical channels corresponding to a same bearer for which the data packet duplication mode is configured/activated are separately reported. In this way, the network side device can accurately know the data amount corresponding to the bearer for which the data packet duplication mode is configured/activated, so that the plurality of logical channels corresponding to the bearer are relatively accurately scheduled on different carriers. The data corresponding to the plurality of logical channels corresponding to the bearer is transmitted on different carriers, thereby improving the performance of resource allocation and avoiding insufficient resource allocation.

Figure 16:
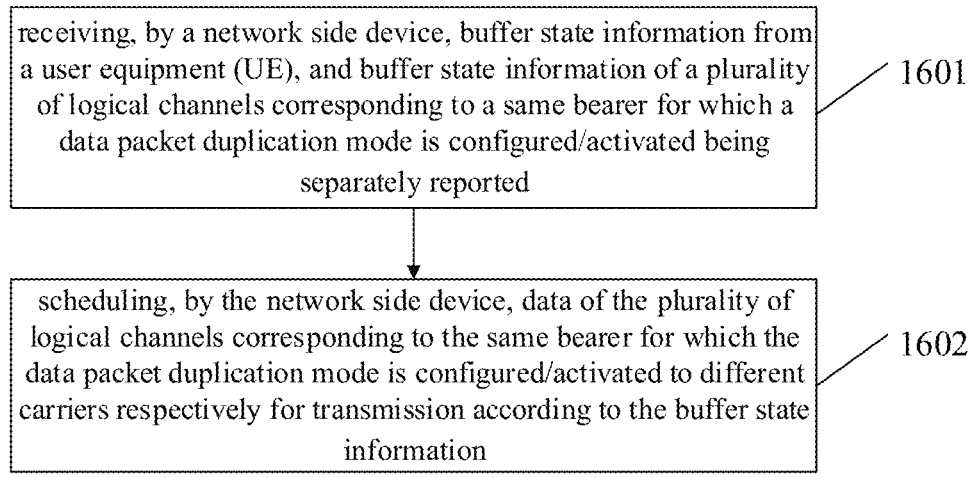
FIG. 16 is a schematic flowchart showing a method of processing a buffer state report according to some embodiments of the present disclosure.

FIG. 16 is a schematic flowchart of a method of processing a buffer state report according to some embodiments of the present disclosure. As shown in FIG. 16, the method includes the following steps.

Step 1601: receiving, by a network side device, buffer state information from a UE, and the buffer state information of a plurality of logical channels corresponding to a same bearer for which a data packet duplication mode is configured/activated being separately reported.

Step 1602: scheduling, by the network side device, data of the plurality of logical channels corresponding to the same bearer for which the data packet duplication mode is configured/activated to different carriers respectively for transmission according to the buffer state information.

Optionally, the receiving, by the network side device, the buffer state information from the UE, includes: receiving, by the network side device, buffer state information of all bearers for which buffer state reporting (BRS) is necessary from the UE by a first BSR Media Access Control Control Element (MAC CE); or receiving, by the network side device, buffer state information of all bearers for which the BSR is necessary and the data packet duplication mode is not configured/activated from UE by a second BSR MAC CE, and receiving, by the network side device, buffer state information of all bearers for which the BSR is necessary and the data packet duplication mode is configured/activated from UE by a third BSR MAC CE.

Optionally, the receiving, by the network side device, the buffer state information of the bearer for which the BRS is necessary from the UE by a first BSR MAC CE includes: receiving, by the network side device, buffer state information reported by the UE by taking a logical channel as a unit; or receiving, by the network side device, buffer state information reported by the UE by taking a logical channel group as a unit; or receiving, by the network side device, buffer state information of a part of logical channels reported by the UE by taking a logical channel as a unit, and buffer state information of other logical channels reported by the UE by taking a logical channel group as a unit, where a plurality of logical channels corresponding to a same bearer for which the data packet duplication mode is configured/activated belong to different logical channel groups.

Optionally, the receiving, by the network side device, buffer state information from the UE by taking a logical channel as a unit includes: receiving, by the network side device, a buffer data amount of each logical channel reported by the UE by taking a logical channel as a unit, and the buffer data amount of each logical channel is the sum of the buffer data amount of the PDCP layer and the buffer data amount of the RLC layer corresponding to the logical channel; or receiving, by the network side device, the buffer data amount of the PDCP layer and the buffer data amount of the RLC layer of each logical channel that are separately reported by the UE by taking a logical channel as a unit; or for the logical channel corresponding to the bearer for which the data packet duplication mode is not configured/activated, receiving, by the network side device, the buffer data amount of each logical channel reported by the UE by taking a logical channel as a unit, and the buffer data amount of each logical channel being the sum of the buffer data amount of the PDCP layer and the buffer data amount of the RLC layer; for the logical channel corresponding to the bearer for which the data packet duplication mode is configured/activated, receiving, by the network side device, the buffer data amount of the PDCP layer and the buffer data amount of the RLC layer of each logical channel reported by the UE by taking a logical channel as a unit.

Optionally, the receiving, by the network side device, the buffer state information reported by the UE by taking a logical channel group as a unit includes: receiving, by the network side device, the buffer data amount of each logical channel group that is reported by the UE by taking a logical channel group as a unit, where the plurality of logical channels corresponding to a same bearer for which the data packet duplication mode is configured/activated belong to different logical channel groups; or receiving, by the network side device, the buffer data amount of each logical channel group reported by UE by taking a logical channel group as a unit, where the plurality of logical channels corresponding to the bearer for which the data packet duplication mode is not configured/activated and logic channels corresponding the bearer for which the data packet duplication mode is configured/activated belong to different logical channel groups, and different logical channels corresponding to a same bearer for which the data packet duplication mode is configured/activated belong to different logic channel groups.

Optionally, the receiving, by the network side device, buffer state information of a part of the logical channels reported by the UE by taking a logical channel as a unit, and buffer state information of the other logical channels reported by the UE by taking a logical channel group as a unit, includes: receiving, by the network side device, the buffer state information of the logical channel corresponding to the bearer for which the data packet duplication mode is configured/activated and the buffer state information of one of the plurality of logical channels corresponding to the bearer for which the data packet duplication mode is configured/activated reported by the UE by taking a logical channel group as a unit, and receiving, by the network side device, buffer state information of other logical channels corresponding to the bearer for which the data packet duplication mode is configured/activated reported by the UE by taking a logical channel as a unit; or receiving, by the network side device, the buffer state information of the logical channel corresponding to the bearer for which the data packet duplication mode is not configured/activated reported by the UE by taking a logical channel group as a unit, and receiving, by the network side device, buffer state information of a plurality of logical channels corresponding to the bearer for which the data packet duplication mode is configured/activated reported by the UE by taking a logical channel as a unit.

Optionally, the receiving, by the network side device, the buffer state information of the bearer for which the data packet duplication mode is configured/activated reported by the UE by using the third BSR MAC CE, includes: receiving, by the network side device, the buffer state information of a plurality of logical channels corresponding to the bearer for which the data packet duplication mode is configured/activated reported by the UE by taking a logical channel and/or a logic channel group as a unit, where the plurality of logical channels corresponding to a same bearer for which the data packet duplication mode is configured/activated belong to different logical channel groups.

Optionally, when the network side device receives the buffer state information reported by the UE by taking a logical channel group as a unit, the network side device receives the buffer data amount of each logical channel group from the UE, where the buffer data amount of each logical channel is the sum of the buffer data amount of the PDCP layer and the buffer data amount of the RLC layer buffer of the logical channel group; or when the network side device receives the buffer state information reported by the UE by taking a logical channel group as a unit, the network side device receives the buffer data amount of the PDCP layer and the buffer data amount of the RLC layer buffer of each logical channel group reported by the UE separately.

Optionally, when the network side device receives the buffer state information reported by the UE by taking a logical channel as a unit, the network side device receives the buffer data amount of each logical channel from the UE, wherein the buffer data amount of each logical channel is the sum of the buffer data amount of the PDCP layer and the buffer data amount of the RLC layer buffer of the logical channel group; or when the network side device receives the buffer state information reported by the UE by taking a logical channel as a unit, the network side device receives the buffer data amount of the PDCP layer and the buffer data amount of the RLC layer buffer of each logical channel group reported by the UE separately.

Optionally, MAC sub-headers corresponding to the first BSR MAC CE, the second BSR MAC CE, and the third BSR MAC CE all carry a logical channel identifier (LCID) and/or length field indication information.

Optionally, the method further includes: configuring, by the network side device, a mapping relationship between the logical channel and the carrier for the UE.

It should be noted that, the network side device in this embodiment corresponds to the embodiment shown in FIG. 1 to FIG. 15. The related steps performed by the network side device may refer to FIG. 1 to FIG. 15 and will not repeated herein.

Figure 17:
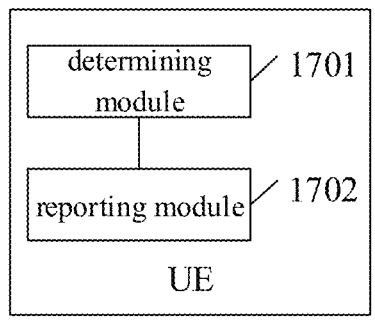
FIG. 17 is a schematic structural diagram showing a UE according to some embodiments of the present disclosure.

FIG. 17 is a schematic structural diagram of a UE according to some embodiments of the present disclosure. As shown in FIG. 17, the UE includes: a determining module 1701, configured to determine whether a buffer state reporting triggering condition is met; a reporting module 1702, configured to report buffer state information to a network side device if the buffer state reporting triggering condition is met, wherein buffer state information of a plurality of logical channels corresponding to a same bearer for which a data packet duplication mode is configured/activated are reported separately.

Optionally, the determining module determines whether the buffer state report triggering condition is met includes: determining, by the determining module, that the buffer state report triggering condition is met when the network side device configures/activates or deconfigures/deactivates the data packet duplication mode for at least one bearer of the UE; or determining, by the determining module, that the buffer state reporting triggering condition is met when a buffer state difference of a plurality of logical channels corresponding to at least one bearer of the UE for which the data packet duplication mode is configured/activated exceeds a preset threshold.

Optionally, the reporting module 1702 is configured to report buffer state information of all bearers for which the BSR is necessary and corresponding to the UE to the network side device through a first BSR MAC CE; or report buffer state information of all bearers for which the BRS is necessary and the data packet duplication mode is not configured/activated to the network side device by using a second BSR MAC CE; and report buffer state information of all bearers for which the BRS is necessary and the data packet duplication mode is configured/activated to the network side device by using a third BSR MAC CE.

Optionally, the reporting module 1702 reports to the network side device the buffer state information of all the bearers for which BSR is necessary by using the first BSR MAC CE includes: reporting buffer state information to the network side device by taking a logical channel as a unit; or reporting buffer state information to the network side device by taking a logical channel group as a unit; or reporting buffer state information of one part of logic channels to the network side device by taking a logical channel as a unit, and buffer state information of the other parts of logic channels to the network side device by taking a logical channel group as a unit, where a plurality of logical channels corresponding to a same bearer for which the data packet duplication mode is configured/activated belong to different logical channel groups.

Optionally, the reporting module 1702 reports the buffer state information to the network side device by taking a logical channel as a unit includes: reporting the buffer data amount of each logical channel to the network side device by taking a logical channel as a unit, and the buffer data amount of each logical channel being the sum of the buffer data amount of the PDCP layer and the buffer data amount of the RLC layer corresponding to the logical channel; or reporting the buffer data amount of the PDCP layer and the buffer data amount of the RLC layer to the network side device respectively by taking a logical channel as a unit; or for the logical channel corresponding to the bearer for which the data packet duplication mode is not configured/activated, reporting, by the reporting module 1702, the buffer data amount of each logical channel to the network side device by taking a logical channel as a unit, and the buffer data amount of each logical channel being the sum of the buffer data amount of the PDCP layer and the buffer data amount of the RLC layer; for the logical channel corresponding to the bearer for which the data packet duplication mode is configured/activated, reporting, by the reporting module 1702, the buffer data amount of the PDCP layer and the buffer data amount of the RLC layer of each logical channel respectively to the network side device by taking a logical channel as a unit.

Optionally, the reporting module 1702 reports the buffer state information to the network side device by taking a logical channel group as a unit, includes: reporting the buffer data amount of each logical channel group to the network side device by taking a logical channel group as a unit, where the plurality of logical channels corresponding to a same bearer for which the data packet duplication mode is configured/activated belong to different logical channel groups; or reporting, the buffer data amount of each logical channel group to the network side device by taking a logical channel group as a unit, where the plurality of logical channels corresponding to the bearer for which the data packet duplication mode is not configured/activated and logic channels corresponding the bearer for which the data packet duplication mode is configured/activated belong to different logical channel groups, and different logical channels corresponding to a same bearer for which the data packet duplication mode is configured/activated belong to different logic channel groups.

Optionally, the reporting module 1702 reports buffer state information of a part of the logical channels to the network side device by taking a logical channel as a unit, and reports buffer state information of the other logical channels to the network side device by taking a logical channel group as a unit, includes: reporting the buffer state information of the logical channel corresponding to the bearer for which the data packet duplication mode is not configured/activated and the buffer state information of one of the plurality of logical channels corresponding to the bearer for which the data packet duplication mode is configured/activated to the network side device by taking a logical channel group as a unit, and reporting buffer state information of other logical channels corresponding to the bearer for which the data packet duplication mode is configured/activated to the network side device by taking a logical channel as a unit; or reporting the buffer state information of the logical channel corresponding to the bearer for which the data packet duplication mode is not configured/activated to the network side device by taking a logical channel group as a unit, and reporting buffer state information of a plurality of logical channels corresponding to the bearer for which the data packet duplication mode is configured/activated to the network side device by taking a logical channel as a unit.

Optionally, the reporting module 1702 reports the buffer state information of the bearer for which the data packet duplication mode is configured/activated to the network side device by using the third BSR MAC CE, includes: reporting the buffer state information of a plurality of logical channels corresponding to the bearer for which the data packet duplication mode is configured/activated to the network side device by taking a logical channel and/or a logic channel group as a unit, where the plurality of logical channels corresponding to a same bearer for which the data packet duplication mode is configured/activated belong to different logical channel groups.

Optionally, when the reporting module 1702 reports the buffer state information to the network side device by taking a logical channel group as a unit, the reporting module 1702 reports the buffer data amount of each logical channel group to the network side device, where the buffer data amount of each logical channel is the sum of the buffer data amount of the PDCP layer and the buffer data amount of the RLC layer buffer of the logical channel group.

When the reporting module 1702 reports the buffer state information to the network side device by taking a logical channel group as a unit, the reporting module 1702 separately reports the buffer data amount of the PDCP layer and the buffer data amount of the RLC layer buffer of each logical channel group to the network side device.

Optionally, when the reporting module 1702 reports the buffer state information to the network side device by taking a logical channel as a unit, the reporting module 1702 reports the buffer data amount of each logical channel to the network side device, where the buffer data amount of each logical channel is the sum of the buffer data amount of the PDCP layer buffer and the data amount of the RLC layer of the logic channel; or when the reporting module 1702 reports the buffer state information to the network side device by taking a logical channel as a unit, the reporting module 1702 separately reports the buffer data amount of the PDCP layer and the buffer data amount of the RLC layer of each logical channel to the network side device.

Optionally, the buffer data amount of the RLC layer of each of the plurality of logical channels corresponding to a same bearer for which the data packet duplication mode is configured/activated is the minimum of the buffer data amount of the RLC layer of the plurality of logical channels corresponding to the bearer.

Optionally, the reporting module 1702 only reports the buffer data amount of one of the logical channels corresponding to a same bearer for which the data packet duplication mode is configured/activated to the network side device.

Optionally, MAC sub-headers corresponding to the first BSR MAC CE, the second BSR MAC CE, and the third BSR MAC CE all carry a logical channel identifier (LCID) and/or length field indication information.

It should be noted that, in this embodiment, the UE is any UE in the embodiments shown in FIG. 1 to FIG. 15. The same beneficial effects is achieved, and details are not described herein.

Figure 18:
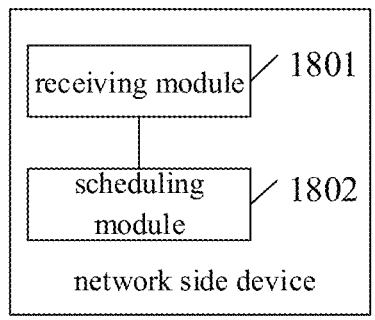
FIG. 18 is a schematic structural diagram showing a network side device according to some embodiments of the present disclosure.

FIG. 18 is a schematic structural diagram of a network side device according to some embodiments of the present disclosure. As shown in FIG. 18, the network side device includes: a receiving module 1801, configured to receive buffer state information from a user equipment (UE), and the buffer state information of a plurality of logical channels corresponding to a same bearer for which the data packet duplication mode is configured/activated being separately reported; a scheduling module 1802, configured to schedule data of the plurality of logical channels corresponding to the same bearer for which the data packet duplication mode is configured/activated to different carriers separately for transmission according to the buffer state information.

Optionally, the receiving module 1801 is configured to receive the buffer state information of the bearer for which the BRS is necessary from the UE by a first BSR MAC CE; or receive buffer state information of all bearers for which the BSR is necessary and the data packet duplication mode is not configured/activated from UE by a second BSR MAC CE, and receive buffer state information of all bearers for which the BSR is necessary and the data packet duplication mode is configured/activated from UE by a third BSR MAC CE.

Optionally, the receiving module 1801 is configured to receive the buffer state information of the bearer for which the BRS is necessary from the UE by a first BSR MAC CE includes: receive buffer state information reported by the UE by taking a logical channel as a unit; or receive buffer state information reported by the UE by taking a logical channel group as a unit; or receive buffer state information of one part of logical channels reported by the UE by taking a logical channel as a unit, and buffer state information of the other parts of logical channels reported by taking a logical channel group as a unit, wherein a plurality of logical channels corresponding to a same bearer for which the data packet duplication mode is configured/activated belong to different logical channel groups.

Optionally, the receiving module 1801 receives buffer state information from the UE by taking a logical channel as a unit includes: receiving a buffer data amount of each logical channel that is reported by the UE by taking a logical channel as a unit, and the buffer data amount of each logical channel is the sum of the buffer data amount of the PDCP layer and the buffer data amount of the RLC layer corresponding to the logical channel; or receiving the buffer data amount of the PDCP layer and the buffer data amount of the RLC layer of each logical channel that are separately reported by the UE by taking a logical channel as a unit; or for the logical channel corresponding to the bearer for which the data packet duplication mode is not configured/activated, receiving, by the receiving module 1801, the buffer data amount of each logical channel reported by the UE by taking a logical channel as a unit, and the buffer data amount of each logical channel being the sum of the buffer data amount of the PDCP layer and the buffer data amount of the RLC layer; for the logical channel corresponding to the bearer for which the data packet duplication mode is configured/activated, receiving, by the receiving module 1801, the buffer data amount of the PDCP layer and the buffer data amount of the RLC layer of each logical channel respectively reported by the UE by taking a logical channel as a unit.

Optionally, the receiving module 1801 receives buffer state information from the UE by taking a logical channel group as a unit includes: receiving the buffer data amount of each logical channel group that is reported by the UE by taking a logical channel group as a unit, where the plurality of logical channels corresponding to a same bearer for which the data packet duplication mode is configured/activated belong to different logical channel groups; or receiving the buffer data amount of each logical channel group reported by UE by taking a logical channel group as a unit, where the plurality of logical channels corresponding to the bearer for which the data packet duplication mode is not configured/activated and logic channels corresponding the bearer for which the data packet duplication mode is configured/activated belong to different logical channel groups, and different logical channels corresponding to a same bearer for which the data packet duplication mode is configured/activated belong to different logic channel groups.

Optionally, the receiving module 1801 receives buffer state information of a part of the logical channels reported by the UE by taking a logical channel as a unit, and buffer state information of the other logical channels reported by the UE by taking a logical channel group as a unit, includes: receiving the buffer state information of the logical channel corresponding to the bearer for which the data packet duplication mode is not configured/activated and the buffer state information of one of the plurality of logical channels corresponding to the bearer for which the data packet duplication mode is configured/activated reported by the UE by taking a logical channel group as a unit, and receiving buffer state information of other logical channels corresponding to the bearer for which the data packet duplication mode is configured/activated reported by the UE by taking a logical channel as a unit; or receiving the buffer state information of the logical channel corresponding to the bearer for which the data packet duplication mode is not configured/activated reported by the UE by taking a logical channel group as a unit, and receiving buffer state information of a plurality of logical channels corresponding to the bearer for which the data packet duplication mode is configured/activated reported by the UE by taking a logical channel as a unit.

Optionally, the receiving module 1801 receives the buffer state information of the bearer for which the data packet duplication mode is configured/activated reported by the UE by using the third BSR MAC CE, includes: receiving the buffer state information of a plurality of logical channels corresponding to the bearer for which the data packet duplication mode is configured/activated reported by the UE by taking a logical channel and/or a logic channel group as a unit, where the plurality of logical channels corresponding to a same bearer for which the data packet duplication mode is configured/activated belong to different logical channel groups.

Optionally, when the receiving module 1801 receives the buffer state information reported by the UE by taking a logical channel group as a unit, the receiving module 1801 receives the buffer data amount of each logical channel group from the UE, where the buffer data amount of each logical channel is the sum of the buffer data amount of the PDCP layer and the buffer data amount of the RLC layer buffer of the logical channel group; or when the receiving module 1801 receives the buffer state information reported by the UE by taking a logical channel group as a unit, the receiving module 1801 receives the buffer data amount of the PDCP layer and the buffer data amount of the RLC layer buffer of each logical channel group reported by the UE separately.

Optionally, when the receiving module 1801 receives the buffer state information reported by the UE by taking a logical channel as a unit, the receiving module 1801 receives the buffer data amount of each logical channel from the UE, where the buffer data amount of each logical channel is the sum of the buffer data amount of the PDCP layer and the buffer data amount of the RLC layer buffer of the logical channel group; or when the receiving module 1801 receives the buffer state information reported by the UE by taking a logical channel as a unit, the receiving module 1801 receives the buffer data amount of the PDCP layer and the buffer data amount of the RLC layer buffer of each logical channel reported by the UE separately.

Optionally, MAC sub-headers corresponding to the first BSR MAC CE, the second BSR MAC CE, and the third BSR MAC CE respectively carry a logical channel identifier (LCID) and/or length field indication information.

Optionally, the scheduling module 1802 is further configured to configure a mapping relationship between the logical channel and the carrier for the UE.

It should be noted that, in this embodiment, the network side device may be the network side device in the embodiment shown in FIG. 1 to FIG. 15. The same beneficial effect is achieved, and details are not described herein again.

Figure 19:
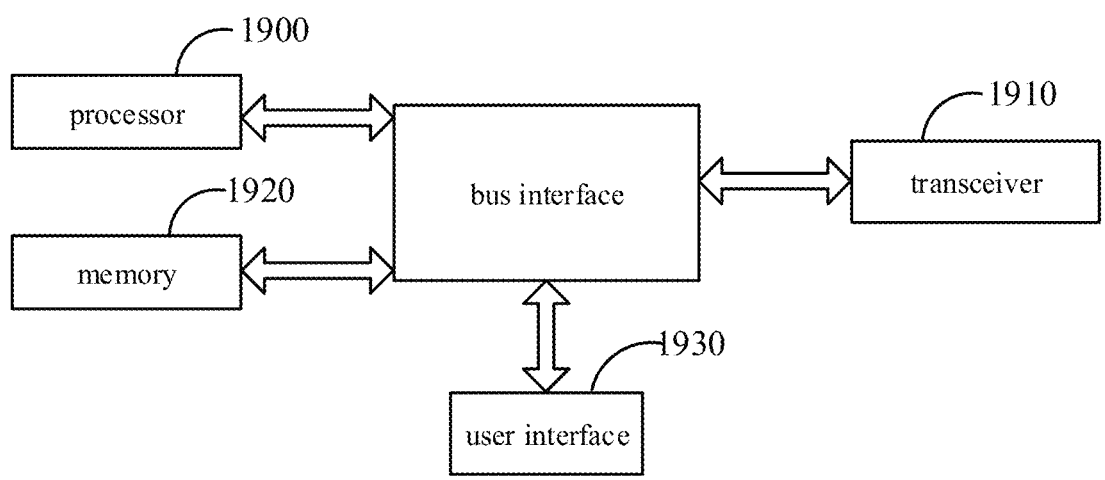
FIG. 19 is another schematic structural diagram showing a UE according to some embodiments of the present disclosure.

FIG. 19 is a schematic structural diagram of a UE according to some embodiments of the present disclosure. As shown in FIG. 19, the UE includes: a processor 1900, a transceiver 1910, a memory 1920, a user interface 1930, and a bus interface.

The processor 1900 is configured to read one or more programs stored in the memory 1920 and perform the following methods: determining whether a buffer state reporting triggering condition is met; and reporting, by the network side device, buffer state information if the buffer state reporting triggering condition is met, wherein buffer state information of a plurality of logical channels corresponding to a same bearer for which a data packet duplication mode is configured/activated are reported separately.

The transceiver 1910 is configured to receive and transmit data under the control of the processor 1900.

In FIG. 19, the bus architecture can include any quantity of interconnected buses and bridges, specifically linked by various circuits such as one or more processors represented by processor 1900 and a memory represented by memory 1920. The bus architecture can also link various other circuits such as peripherals, voltage regulators, and power management circuits, which are well known in the art and, therefore, will not be further described herein. The bus interface provides an interface. A transceiver 1910 may be a plurality of components, including a transmitter and a receiver, used for communicating with various other devices on a transmission medium. For different UEs, the user interface 1930 may also be an interface capable of externally or internally connecting the required devices, including but not limited to a keypad, a display, a speaker, a microphone, a joystick, and the like.

The processor 1900 is responsible for managing the bus architecture and general processing, and the memory 1920 can store data used by the processor 1900 during performing operations.

Optionally, the processor 1900 determines whether the buffer state reporting triggering condition is met, includes: determining that the buffer state report triggering condition is met when the network side device configures/activates or deconfigures/deactivates the data packet duplication mode for at least one bearer of the UE; or determining that the buffer state reporting triggering condition is met when a buffer state difference of a plurality of logical channels corresponding to at least one bearer of the UE for which the data packet duplication mode is configured/activated exceeds a preset threshold.

Optionally, the processor 1900 reports the buffer state information to the network side device includes: reporting buffer state information of all bearers for which the BSR is necessary and corresponding to the UE to the network side device through a first BSR MAC CE; or reporting buffer state information of all bearers for which the BRS is necessary and the data packet duplication mode is not configured/activated to the network side device by using a second BSR MAC CE; and reporting buffer state information of all bearers for which the BRS is necessary and the data packet duplication mode is configured/activated to the network side device by using a third BSR MAC CE.

Optionally, the processor 1900 reports the buffer state information of all bearers corresponding to the UE to the network side device by using the first BSR MAC CE includes: reporting buffer state information to the network side device by taking a logical channel as a unit; or reporting buffer state information to the network side device by taking a logical channel group as a unit; or reporting buffer state information of one part of logic channels to the network side device by taking a logical channel as a unit, and buffer state information of the other parts of logic channels to the network side device by taking a logical channel group as a unit, where a plurality of logical channels corresponding to a same bearer for which the data packet duplication mode is configured/activated belong to different logical channel groups.

Optionally, the processor 1900 reports the buffer state information to the network side device by taking a logical channel as a unit includes: reporting the buffer data amount of each logical channel to the network side device by taking a logical channel as a unit, and the buffer data amount of each logical channel being the sum of the buffer data amount of the PDCP layer and the buffer data amount of the RLC layer corresponding to the logical channel; or reporting the buffer data amount of the PDCP layer and the buffer data amount of the RLC layer to the network side device respectively by taking a logical channel as a unit; or for the logical channel corresponding to the bearer for which the data packet duplication mode is not configured/activated, reporting the buffer data amount of each logical channel to the network side device by taking a logical channel as a unit, and the buffer data amount of each logical channel being the sum of the buffer data amount of the PDCP layer and the buffer data amount of the RLC layer; for the logical channel corresponding to the bearer for which the data packet duplication mode is configured/activated, reporting the buffer data amount of the PDCP layer and the buffer data amount of the RLC layer of each logical channel respectively to the network side device by taking a logical channel as a unit.

Optionally, the processor 1900 reports the buffer state information to the network side device by taking a logical channel group as a unit includes: reporting the buffer data amount of each logical channel group to the network side device by taking a logical channel group as a unit, where the plurality of logical channels corresponding to a same bearer for which the data packet duplication mode is configured/ activated belong to different logical channel groups; or reporting the buffer data amount of each logical channel group to the network side device by taking a logical channel group as a unit, where the plurality of logical channels corresponding to the bearer for which the data packet duplication mode is not configured/activated and logic channels corresponding the bearer for which the data packet duplication mode is configured/activated belong to different logical channel groups, and different logical channels corresponding to a same bearer for which the data packet duplication mode is configured/activated belong to different logic channel groups.

Optionally, the processor 1900 reports buffer state information of a part of the logical channels to the network side device by taking a logical channel as a unit, and reports buffer state information of the other logical channels to the network side device by taking a logical channel group as a unit, includes: reporting the buffer state information of the logical channel corresponding to the bearer for which the data packet duplication mode is configured/activated and the buffer state information of one of the plurality of logical channels corresponding to the bearer for which the data packet duplication mode is configured/activated to the network side device by taking a logical channel group as a unit, and reporting buffer state information of other logical channels corresponding to the bearer for which the data packet duplication mode is configured/activated to the network side device by taking a logical channel as a unit; or reporting the buffer state information of the logical channel corresponding to the bearer for which the data packet duplication mode is not configured/activated to the network side device by taking a logical channel group as a unit, and reporting buffer state information of a plurality of logical channels corresponding to the bearer for which the data packet duplication mode is configured/activated to the network side device by taking a logical channel as a unit.

Optionally, the processor 1900 reports the buffer state information of the bearer for which the data packet duplication mode is configured/activated to the network side device by using the third BSR MAC CE, includes: reporting the buffer state information of a plurality of logical channels corresponding to the bearer for which the data packet duplication mode is configured/activated to the network side device by taking a logical channel and/or a logic channel group as a unit, where the plurality of logical channels corresponding to a same bearer for which the data packet duplication mode is configured/activated belong to different logical channel groups.

Optionally, when the processor 1900 reports the buffer state information to the network side device by taking a logical channel group as a unit, the processor 1900 reports the buffer data amount of each logical channel group to the network side device, where the buffer data amount of each logical channel is the sum of the buffer data amount of the PDCP layer and the buffer data amount of the RLC layer buffer of the logical channel group.

When the processor 1900 reports the buffer state information to the network side device by taking a logical channel group as a unit, the processor 1900 separately reports the buffer data amount of the PDCP layer and the buffer data amount of the RLC layer buffer of each logical channel group to the network side device.

Optionally, when the processor 1900 reports the buffer state information to the network side device by taking a logical channel as a unit, the processor 1900 reports the buffer data amount of each logical channel to the network side device, where the buffer data amount of each logical channel is the sum of the buffer data amount of the PDCP layer buffer and the data amount of the RLC layer of the logic channel; or when the processor 1900 reports the buffer state information to the network side device by taking a logical channel as a unit, the processor 1900 separately reports the buffer data amount of the PDCP layer and the buffer data amount of the RLC layer of each logical channel to the network side device Optionally, the buffer data amount of the RLC layer of each of the plurality of logical channels corresponding to a same bearer for which the data packet duplication mode is configured/activated is the minimum of the buffer data amount of the RLC layer of the plurality of logical channels corresponding to the bearer.

Optionally, the processor 1900 only reports the buffer data amount of one of the logical channels corresponding to the bearer for which the data packet duplication mode is configured/activated to the network side device.

Optionally, the MAC sub-heads corresponding to the first BSR MAC CE, the second BSR MAC CE, and the third BSR MAC CE respectively carry the logical channel identifier LCID and/or the length field indication information.

It should be noted that, in this embodiment, the foregoing UE may be the UE in the embodiment shown in FIG. 1 to FIG. 15. The same beneficial effect is achieved, and details are not described herein again.

Figure 20:
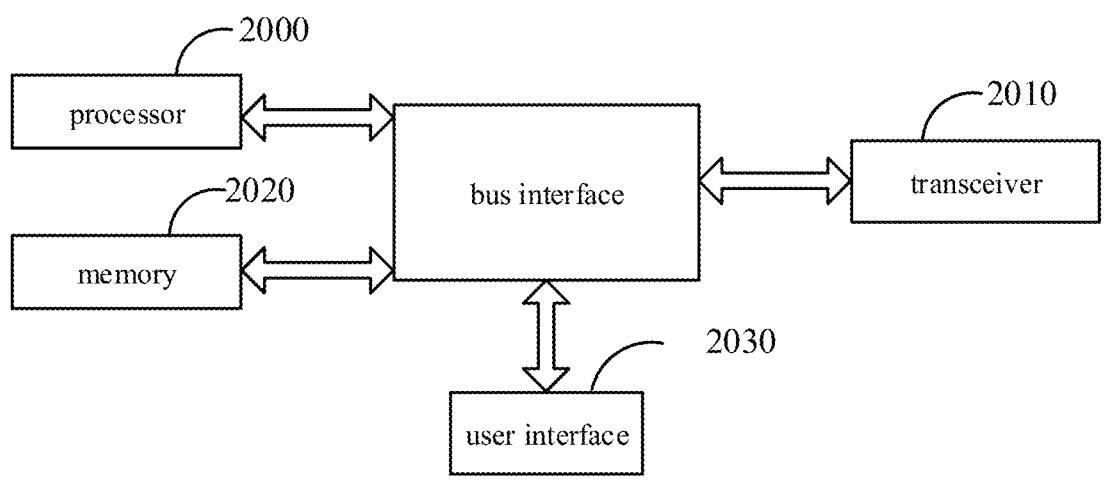
FIG. 20 is another schematic structural diagram showing a network side device according to some embodiments of the present disclosure.

FIG. 20 is a schematic structural diagram of a network side device according to some embodiments of the present disclosure. As shown in FIG. 20, the network side device includes: a processor 2000, a transceiver 2010, a memory 2020, and a user interface 2030 and a bus interface.

The processor 2000 is configured to read one or more programs stored in the memory 2020, and perform the following method: receiving buffer state information from a UE, and the buffer state information of a plurality of logical channels corresponding to the bearer for which the data packet duplication mode is configured/activated being separately reported; and scheduling data of the plurality of logical channels corresponding to a same bearer for which the data packet duplication mode is configured/activated to different carriers respectively for transmission according to the buffer state information.

The transceiver 2010 is configured to receive and transmit data under the control of the processor 2000.

In FIG. 20, the bus architecture can include any quantity of interconnected buses and bridges, specifically linked by various circuits such as one or more processors represented by processor 2000 and memory represented by memory 2020. The bus architecture can also link various other circuits such as peripherals, voltage regulators, and power management circuits, which are well known in the art and, therefore, will not be further described herein. The bus interface provides an interface. The transceiver 2010 can be a plurality of components, including a transmitter and a receiver, used for communicating with various other devices on a transmission medium. For different UEs, the user interface 2030 may also be an interface capable of externally and internally connecting the required devices, including but not limited to a keypad, a display, a speaker, a microphone, a joystick, and the like.

The processor 2000 is responsible for managing the bus architecture and the usual processing, and the memory 2020 can store data used by the processor 2000 in performing operations.

Optionally, the processor 2000 is configured to receive the buffer state information of the bearer for which the BRS is necessary from the UE by a first BSR MAC CE; or receive buffer state information of all bearers for which the BSR is necessary and the data packet duplication mode is not configured/activated from UE by a second BSR MAC CE, and receive buffer state information of all bearers for which the BSR is necessary and the data packet duplication mode is configured/activated from UE by a third BSR MAC CE.

Optionally, the processor 2000 is configured to receive the buffer state information of the bearer for which the BRS is necessary from the UE by a first BSR MAC CE includes: receiving buffer state information reported by the UE by taking a logical channel as a unit; or receiving buffer state information reported by the UE by taking a logical channel group as a unit; or receiving buffer state information of a part of logical channels reported by the UE by taking a logical channel as a unit, and buffer state information of other logical channels reported by taking a logical channel group as a unit, where a plurality of logical channels corresponding to a same bearer for which the data packet duplication mode is configured/activated belong to different logical channel groups.

Optionally, the processor 2000 is configured to receive buffer state information from the UE by taking a logical channel as a unit includes: receiving a buffer data amount of each logical channel that is reported by the UE by taking a logical channel as a unit, and the buffer data amount of each logical channel is the sum of the buffer data amount of the PDCP layer and the buffer data amount of the RLC layer corresponding to the logical channel; or receiving the buffer data amount of the PDCP layer and the buffer data amount of the RLC layer of each logical channel that are separately reported by the UE by taking a logical channel as a unit; or for the logical channel corresponding to the bearer for which the data packet duplication mode is not configured/activated, receiving, by the processor 2000, the buffer data amount of each logical channel reported by the UE by taking a logical channel as a unit, and the buffer data amount of each logical channel being the sum of the buffer data amount of the PDCP layer and the buffer data amount of the RLC layer; for the logical channel corresponding to the bearer for which the data packet duplication mode is configured/activated, receiving, by the processor 2000, the buffer data amount of the PDCP layer and the buffer data amount of the RLC layer of each logical channel respectively reported by the UE by taking a logical channel as a unit.

Optionally, the processor 2000 is configured to receive the buffer state information reported by the UE by taking a logical channel group as a unit includes: receiving the buffer data amount of each logical channel group that is reported by the UE by taking a logical channel group as a unit, where the plurality of logical channels corresponding to a same bearer for which the data packet duplication mode is configured/activated belong to different logical channel groups; or receiving the buffer data amount of each logical channel group reported by UE by taking a logical channel group as a unit, where the plurality of logical channels corresponding to the bearer for which the data packet duplication mode is not configured/activated and logic channels corresponding the bearer for which the data packet duplication mode is configured/activated belong to different logical channel groups, and different logical channels corresponding to a same bearer for which the data packet duplication mode is configured/activated belong to different logic channel groups.

Optionally, the processor 2000 is configured to receive buffer state information of a part of the logical channels reported by the UE by taking a logical channel as a unit, and buffer state information of the other logical channels reported by the UE by taking a logical channel group as a unit, includes: receiving the buffer state information of the logical channel corresponding to the bearer for which the data packet duplication mode is configured/activated and the buffer state information of one of the plurality of logical channels corresponding to the bearer for which the data packet duplication mode is configured/activated reported by the UE by taking a logical channel group as a unit, and receiving buffer state information of other logical channels corresponding to the bearer for which the data packet duplication mode is configured/activated reported by the UE by taking a logical channel as a unit; or receiving the buffer state information of the logical channel corresponding to the bearer for which the data packet duplication mode is not configured/activated reported by the UE by taking a logical channel group as a unit, and receiving buffer state information of a plurality of logical channels corresponding to the bearer for which the data packet duplication mode is configured/activated reported by the UE by taking a logical channel as a unit.

Optionally, the processor 2000 is configured to receive the buffer state information of the bearer for which the data packet duplication mode is configured/activated reported by the UE by using the third BSR MAC CE, includes: receiving the buffer state information of a plurality of logical channels corresponding to the bearer for which the data packet duplication mode is configured/activated reported by the UE by taking a logical channel and/or a logic channel group as a unit, where the plurality of logical channels corresponding to a same bearer for which the data packet duplication mode is configured/activated belong to different logical channel groups.

Optionally, when the processor 2000 receives the buffer state information reported by the UE by taking a logical channel group as a unit, the processor 2000 receives the buffer data amount of each logical channel group from the UE, where the buffer data amount of each logical channel is the sum of the buffer data amount of the PDCP layer and the buffer data amount of the RLC layer buffer of the logical channel group; or when the processor 2000 receives the buffer state information reported by the UE by taking a logical channel group as a unit, the processor 2000 receives the buffer data amount of the PDCP layer and the buffer data amount of the RLC layer buffer of each logical channel group reported by the UE separately.

Optionally, when the processor 2000 receives the buffer state information reported by the UE by taking a logical channel as a unit, the processor 2000 receives the buffer data amount of each logical channel from the UE, where the buffer data amount of each logical channel is the sum of the buffer data amount of the PDCP layer and the buffer data amount of the RLC layer buffer of the logical channel; or when the processor 2000 receives the buffer state information reported by the UE by taking a logical channel as a unit, the processor 2000 receives the buffer data amount of the PDCP layer and the buffer data amount of the RLC layer buffer of each logical channel reported by the UE separately.

Optionally, the MAC sub-heads corresponding to the first BSR MAC CE, the second BSR MAC CE, and the third BSR MAC CE respectively carry the logical channel identifier LCID and/or the length field indication information.

Optionally, the processor 2000 is further configured to set a mapping relationship between the logical channel and the carrier for the UE.

It should be noted that, in this embodiment, the network side device may be the network side device in the embodiment shown in FIG. 1 to FIG. 15. The same beneficial effect is achieved, and details are not described herein again.

The present disclosure also provides a computer readable storage medium having stored therein one or more programs executable by a computer, the one or more programs are executed by the computer to cause the computer to execute the following steps: determining whether a buffer state reporting triggering condition is met; and reporting buffer state information to a network side device if the buffer state reporting triggering condition is met, wherein buffer state information of a plurality of logical channels corresponding to a same bearer for which a data packet duplication mode is configured/activated are reported separately.

Optionally, the determining whether a buffer state report triggering condition is met, includes: determining that the buffer state report triggering condition is met when the network side device configures/activates or deconfigures/deactivates the data packet duplication mode for at least one bearer of the UE; or determining that the buffer state reporting triggering condition is met when a buffer state difference of a plurality of logical channels corresponding to at least one bearer of the UE for which the data packet duplication mode is configured/activated exceeds a preset threshold.

Optionally, the reporting the buffer state information to the network side device includes: reporting buffer state information of all bearers for which the BSR is necessary and corresponding to the UE to the network side device through a first BSR MAC CE; or reporting buffer state information of all bearers for which the BRS is necessary and the data packet duplication mode is not configured/activated to the network side device by using a second BSR MAC CE; and reporting buffer state information of all bearers for which the BRS is necessary and the data packet duplication mode is configured/activated to the network side device by using a third BSR MAC CE Optionally, the reporting the buffer state information of all bearers corresponding to the UE to the network side device by using the first BSR MAC CE includes: reporting buffer state information to the network side device by taking a logical channel as a unit; or reporting buffer state information to the network side device by taking a logical channel group as a unit; or reporting buffer state information of one part of logic channels to the network side device by taking a logical channel as a unit, and buffer state information of the other parts of logic channels to the network side device by taking a logical channel group as a unit, where a plurality of logical channels corresponding to a same bearer for which the data packet duplication mode is configured/activated belong to different logical channel groups.

Optionally, the reporting the buffer state information to the network side device by taking a logical channel as a unit includes: reporting the buffer data amount of each logical channel to the network side device by taking a logical channel as a unit, and the buffer data amount of each logical channel being the sum of the buffer data amount of the PDCP layer and the buffer data amount of the RLC layer corresponding to the logical channel; or reporting the buffer data amount of the PDCP layer and the buffer data amount of the RLC layer to the network side device respectively by taking a logical channel as a unit; or for the logical channel corresponding to the bearer for which the data packet duplication mode is not configured/activated, reporting the buffer data amount of each logical channel to the network side device by taking a logical channel as a unit, and the buffer data amount of each logical channel being the sum of the buffer data amount of the PDCP layer and the buffer data amount of the RLC layer; for the logical channel corresponding to the bearer for which the data packet duplication mode is configured/activated, reporting the buffer data amount of the PDCP layer and the buffer data amount of the RLC layer of each logical channel respectively to the network side device by taking a logical channel as a unit.

Optionally, the reporting the buffer state information to the network side device by taking a logical channel group as a unit includes: reporting the buffer data amount of each logical channel group to the network side device by taking a logical channel group as a unit, where the plurality of logical channels corresponding to a same bearer for which the data packet duplication mode is configured/activated belong to different logical channel groups; or reporting the buffer data amount of each logical channel group to the network side device by taking a logical channel group as a unit, where the plurality of logical channels corresponding to the bearer for which the data packet duplication mode is not configured/activated and logic channels corresponding the bearer for which the data packet duplication mode is configured/activated belong to different logical channel groups, and different logical channels corresponding to a same bearer for which the data packet duplication mode is configured/activated belong to different logic channel groups.

Optionally, the reporting buffer state information of a part of the logical channels to the network side device by taking a logical channel as a unit, and reporting buffer state information of the other logical channels to the network side device by taking a logical channel group as a unit, includes: reporting the buffer state information of the logical channel corresponding to the bearer for which the data packet duplication mode is configured/activated and the buffer state information of one of the plurality of logical channels corresponding to the bearer for which the data packet duplication mode is configured/activated to the network side device by taking a logical channel group as a unit, and reporting buffer state information of other logical channels corresponding to the bearer for which the data packet duplication mode is configured/activated to the network side device by taking a logical channel as a unit; or reporting the buffer state information of the logical channel corresponding to the bearer for which the data packet duplication mode is not configured/activated to the network side device by taking a logical channel group as a unit, and reporting buffer state information of a plurality of logical channels corresponding to the bearer for which the data packet duplication mode is configured/activated to the network side device by taking a logical channel as a unit.

Optionally, the reporting the buffer state information of the bearer for which the data packet duplication mode is configured/activated to the network side device by using the third BSR MAC CE, includes: reporting the buffer state information of a plurality of logical channels corresponding to the bearer for which the data packet duplication mode is configured/activated to the network side device by taking a logical channel and/or a logic channel group as a unit, where the plurality of logical channels corresponding to a same bearer for which the data packet duplication mode is configured/activated belong to different logical channel groups.

Optionally, when the buffer state information is reported to the network side device by taking a logical channel group as a unit, the buffer data amount of each logical channel group is reported to the network side device, where the buffer data amount of each logical channel is the sum of the buffer data amount of the PDCP layer and the buffer data amount of the RLC layer buffer of the logical channel group.

When the buffer state information is reported to the network side device by taking a logical channel group as a unit, the buffer data amount of the PDCP layer and the buffer data amount of the RLC layer buffer of each logical channel group are separately reported to the network side device.

Optionally, when the buffer state information is reported to the network side device by taking a logical channel as a unit, the buffer data amount of each logical channel is reported to the network side device, where the buffer data amount of each logical channel is the sum of the buffer data amount of the PDCP layer buffer and the data amount of the RLC layer of the logic channel; or when the buffer state information is reported to the network side device by taking a logical channel as a unit, the buffer data amount of the PDCP layer and the buffer data amount of the RLC layer of each logical channel are separately reported to the network side device.

Optionally, the buffer data amount of the RLC layer of each of the plurality of logical channels corresponding to a same bearer for which the data packet duplication mode is configured/activated is the minimum of the buffer data amount of the RLC layer of the plurality of logical channels corresponding to the bearer.

Optionally, the buffer data amount of only one of the logical channels corresponding to the bearer for which the data packet duplication mode is configured/activated is reported to the network side device.

Optionally, the MAC sub-heads corresponding to the first BSR MAC CE, the second BSR MAC CE, and the third BSR MAC CE respectively carry the logical channel identifier LCID and/or the length field indication information.

The present disclosure also provides a computer readable storage medium having stored therein one or more programs executable by a computer, the one or more programs are executed by the computer to cause the computer to execute the following steps: receiving buffer state information from a UE, and the buffer state information of a plurality of logical channels corresponding to the bearer for which the data packet duplication mode is configured/activated being separately reported; scheduling data of the plurality of logical channels corresponding to a same bearer for which the data packet duplication mode is configured/activated to different carriers respectively for transmission according to the buffer state information.

Optionally, the receiving the buffer state information from the UE, includes: receiving the buffer state information of the bearer for which the BRS is necessary from the UE by a first BSR MAC CE; or receiving buffer state information of all bearers for which the BSR is necessary and the data packet duplication mode is not configured/activated from UE by a second BSR MAC CE, and receiving buffer state information of all bearers for which the BSR is necessary and the data packet duplication mode is configured/activated from UE by a third BSR MAC CE.

Optionally, the receiving the buffer state information of the bearer for which the BRS is necessary from the UE by a first BSR MAC CE includes: receiving buffer state information reported by the UE by taking a logical channel as a unit; or receiving buffer state information reported by the UE by taking a logical channel group as a unit; or receiving buffer state information of a part of logical channels reported by the UE by taking a logical channel as a unit, and buffer state information of other logical channels reported by taking a logical channel group as a unit, where a plurality of logical channels corresponding to a same bearer for which the data packet duplication mode is configured/activated belong to different logical channel groups.

Optionally, the receiving buffer state information from the UE by taking a logical channel as a unit includes: receiving a buffer data amount of each logical channel that is reported by the UE by taking a logical channel as a unit, and the buffer data amount of each logical channel is the sum of the buffer data amount of the PDCP layer and the buffer data amount of the RLC layer corresponding to the logical channel; or receiving the buffer data amount of the PDCP layer and the buffer data amount of the RLC layer of each logical channel that are separately reported by the UE by taking a logical channel as a unit; or for the logical channel corresponding to the bearer for which the data packet duplication mode is not configured/activated, receiving the buffer data amount of each logical channel reported by the UE by taking a logical channel as a unit, and the buffer data amount of each logical channel being the sum of the buffer data amount of the PDCP layer and the buffer data amount of the RLC layer; for the logical channel corresponding to the bearer for which the data packet duplication mode is configured/activated, receiving the buffer data amount of the PDCP layer and the buffer data amount of the RLC layer of each logical channel respectively reported by the UE by taking a logical channel as a unit.

Optionally, the receiving the buffer state information reported by the UE by taking a logical channel group as a unit includes: receiving the buffer data amount of each logical channel group that is reported by the UE by taking a logical channel group as a unit, where the plurality of logical channels corresponding to a same bearer for which the data packet duplication mode is configured/activated belong to different logical channel groups; or receiving the buffer data amount of each logical channel group reported by UE by taking a logical channel group as a unit, where the plurality of logical channels corresponding to the bearer for which the data packet duplication mode is not configured/activated and logic channels corresponding the bearer for which the data packet duplication mode is configured/activated belong to different logical channel groups, and different logical channels corresponding to a same bearer for which the data packet duplication mode is configured/activated belong to different logic channel groups.

Optionally, the receiving buffer state information of a part of the logical channels reported by the UE by taking a logical channel as a unit, and buffer state information of the other logical channels reported by the UE by taking a logical channel group as a unit, includes: receiving the buffer state information of the logical channel corresponding to the bearer for which the data packet duplication mode is configured/activated and the buffer state information of one of the plurality of logical channels corresponding to the bearer for which the data packet duplication mode is configured/activated reported by the UE by taking a logical channel group as a unit, and receiving buffer state information of other logical channels corresponding to the bearer for which the data packet duplication mode is configured/activated reported by the UE by taking a logical channel as a unit; or receiving the buffer state information of the logical channel corresponding to the bearer for which the data packet duplication mode is not configured/activated reported by the UE by taking a logical channel group as a unit, and receiving buffer state information of a plurality of logical channels corresponding to the bearer for which the data packet duplication mode is configured/activated reported by the UE by taking a logical channel as a unit.

Optionally, the receiving the buffer state information of the bearer for which the data packet duplication mode is configured/activated reported by the UE by using the third BSR MAC CE, includes: receiving the buffer state information of a plurality of logical channels corresponding to the bearer for which the data packet duplication mode is configured/activated reported by the UE by taking a logical channel and/or a logic channel group as a unit, where the plurality of logical channels corresponding to a same bearer for which the data packet duplication mode is configured/activated belong to different logical channel groups.

Optionally, when the buffer state information reported by the UE is received by taking a logical channel group as a unit, the buffer data amount of each logical channel group is received from the UE, where the buffer data amount of each logical channel is the sum of the buffer data amount of the PDCP layer and the buffer data amount of the RLC layer buffer of the logical channel group; or when the buffer state information reported by the UE is received by taking a logical channel group as a unit, the buffer data amount of the PDCP layer and the buffer data amount of the RLC layer buffer of each logical channel group reported by the UE are received separately.

Optionally, the MAC sub-heads corresponding to the first BSR MAC CE, the second BSR MAC CE, and the third BSR MAC CE respectively carry the logical channel identifier LCID and/or the length field indication information.

Optionally, the method further implements the following step: configuring a mapping relationship between the logical channel and the carrier for the UE.

The storage medium is, for example, a read-only memory (ROM), a random access memory (RAM), a magnetic disk, or an optical disk.

In the several embodiments provided in the present disclosure, it should be understood that the method and device may be implemented in other manners. For example, the device described above are merely illustrative. For example, a unit is divided only by logical functions. In an actual implementation, there may be another division manner, for example, a plurality of units or components may be combined or integrated into another system, or some features can be ignored or not executed. In addition, the mutual coupling or direct coupling or communication connection shown or discussed above may be an indirect coupling or communication connection through some interface, device or unit, and may be in an electrical, mechanical or other form.

In addition, each functional unit in various embodiments of the present disclosure may be integrated into one processing unit, or each unit may be physically separated, or two or more units may be integrated into one unit. The above integrated unit can be implemented in the form of hardware or in the form of hardware and software.

The above-described integrated unit implemented in the form of software can be stored in a computer readable storage medium. The above software is stored in a storage medium and includes a plurality of instructions for causing a computer device (which may be a personal computer, a server, or a network device, etc.) to perform a part of the steps of the transmitting method of the various embodiments of the present disclosure. The foregoing storage medium includes: a U disk, a mobile hard disk, a Read-Only Memory (ROM), a Random Access Memory (RAM), a disk or an optical disk, and the like, which can store program codes.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A buffer state reporting method, comprising:
   determining, by a user equipment (UE), whether a buffer state reporting triggering condition is met; and
   reporting, by the UE, buffer state information to a network side device if the buffer state reporting triggering condition is met, wherein buffer state information of a plurality of logical channels corresponding to a same bearer for which a data packet duplication mode is configured/activated are reported separately,
   wherein the reporting, by the UE, the buffer state information to the network side device comprises:
   reporting, by the UE, buffer state information of all bearers for which the buffer state reporting (BSR) is necessary and corresponding to the UE to the network side device through a first BSR Media Access Control Control Element (MAC CE); or
   reporting, by the UE, buffer state information of all bearers for which the BRS is necessary and the data packet duplication mode is not configured/activated to the network side device by using a second BSR MAC CE; and reporting, by the UE, buffer state information of all bearers for which the BRS is necessary and the data packet duplication mode is configured/activated to the network side device by using a third BSR MAC CE,
   wherein the reporting, by the UE, the buffer state information of all bearers corresponding to the UE to the network side device by using the first BSR MAC CE comprises:
   reporting, by the UE, buffer state information to the network side device by taking a logical channel as a unit; or
   reporting, by the UE, buffer state information to the network side device by taking a logical channel group as a unit; or
   reporting, by the UE, buffer state information of one part of logic channels to the network side device by taking a logical channel as a unit, and buffer state information of the other parts of logic channels to the network side device by taking a logical channel group as a unit, wherein a plurality of logical channels corresponding to a same bearer for which the data packet duplication mode is configured/activated belong to different logical channel groups.

2. The buffer state reporting method according to claim 1, wherein the determining, by the UE, whether a buffer state report triggering condition is met comprises:
   determining, by the UE, that the buffer state report triggering condition is met when the network side device configures/activates or deconfigures/deactivates the data packet duplication mode for at least one bearer of the UE; or
   determining, by the UE, that the buffer state reporting triggering condition is met when a buffer state difference of a plurality of logical channels corresponding to at least one bearer of the UE for which the data packet duplication mode is configured/activated exceeds a preset threshold.

3. The buffer state reporting method according to claim 1, wherein the reporting, by the UE, the buffer state information to the network side device by taking a logical channel as a unit comprises:
   reporting, by the UE, buffer data amount of each logical channel to the network side device by taking a logical channel as a unit, and the buffer data amount of each logical channel being a sum of a buffer data amount of a Packet Data Convergence Protocol (PDCP) layer and a buffer data amount of a Radio Link Control (RLC) layer corresponding to the logical channel; or reporting, by the UE, the buffer data amount of the PDCP layer and the buffer data amount of the RLC layer to the network side device separately by taking a logical channel as a unit; or for a logical channel corresponding to the bearer for which the data packet duplication mode is not configured/activated, reporting, by the UE, the buffer data amount of each logical channel to the network side device by taking a logical channel as a unit, and the buffer data amount of each logical channel being the sum of the buffer data amount of the PDCP layer and the buffer data amount of the RLC layer; for logical channels corresponding to the bearer for which the data packet duplication mode is configured/activated, reporting, by the UE, the buffer data amount of the PDCP layer and the buffer data amount of the RLC layer of each logical channel separately to the network side device by taking a logical channel as a unit.

4. The buffer state reporting method according to claim 1, wherein the reporting, by the UE, the buffer state information to the network side device by taking a logical channel group as a unit comprises:

reporting, by the UE, a buffer data amount of each logical channel group to the network side device by taking a logical channel group as a unit, wherein a plurality of logical channels corresponding to a same bearer for which the data packet duplication mode is configured/activated belong to different logical channel groups; or reporting, by the UE, the buffer data amount of each logical channel group to the network side device by taking a logical channel group as a unit, wherein logical channels corresponding to the bearer for which the data packet duplication mode is not configured/activated and logic channels corresponding the bearer for which the data packet duplication mode is configured/activated belong to different logical channel groups, and different logical channels corresponding to a same bearer for which the data packet duplication mode is configured/activated belong to different logic channel groups.

5. The buffer state reporting method according to claim 1, wherein the reporting, by the UE, buffer state information of one part of the logical channels to the network side device by taking a logical channel as a unit, and reporting buffer state information of the other parts of logical channels to the network side device by taking a logical channel group as a unit, comprises:

reporting, by the UE, the buffer state information of the logical channel corresponding to the bearer for which the data packet duplication mode is not configured/activated and the buffer state information of one of the plurality of logical channels corresponding to the bearer for which the data packet duplication mode is configured/activated to the network side device by taking a logical channel group as a unit, and reporting, by the UE, buffer state information of other logical channels corresponding to the bearer for which the data packet duplication mode is configured/activated to the network side device by taking a logical channel as a unit; or reporting, by the UE, the buffer state information of the logical channel corresponding to the bearer for which the data packet duplication mode is not configured/activated to the network side device by taking a logical channel group as a unit, and reporting, by the UE, the buffer state information of the plurality of logical channels corresponding to the bearer for which the data packet duplication mode is configured/activated to the network side device by taking a logical channel as a unit.

6. The buffer state reporting method according to claim 1, wherein the reporting, by the UE, the buffer state information of the bearer for which the data packet duplication mode is configured/activated to the network side device by using the third BSR MAC CE, comprises:

reporting, by the UE, the buffer state information of the plurality of logical channels corresponding to the bearer for which the data packet duplication mode is configured/activated to the network side device by taking a logical channel and/or a logic channel group as a unit, wherein the plurality of logical channels corresponding to a same bearer for which the data packet duplication mode is configured/activated belong to different logical channel groups.

7. The buffer state reporting method according to claim 4, wherein when the UE reports the buffer state information to the network side device by taking a logical channel group as a unit, the UE reports the buffer data amount of each logical channel group to the network side device, wherein the buffer data amount of each logical channel is the sum of the buffer data amount of the PDCP layer and the buffer data amount of the RLC layer buffer of the logical channel group; or when the UE reports the buffer state information to the network side device by taking a logical channel group as a unit, the UE separately reports the buffer data amount of the PDCP layer and the buffer data amount of the RLC layer buffer of each logical channel group to the network side device.

8. The buffer state reporting method according to claim 4, wherein when the UE reports the buffer state information to the network side device by taking a logical channel as a unit, the UE reports the buffer data amount of each logical channel to the network side device, wherein the buffer data amount of each logical channel is the sum of the buffer data amount of the PDCP layer buffer and the data amount of the RLC layer of the logic channel; or when the UE reports the buffer state information to the network side device by taking a logical channel as a unit, the UE separately reports the buffer data amount of the PDCP layer and the buffer data amount of the RLC layer of each logical channel to the network side device.

9. The buffer state reporting method according to claim 3, wherein the buffer data amount of the RLC layer of each of the plurality of logical channels corresponding to a same bearer for which the data packet duplication mode is configured/activated is a minimum of buffer data amount of the RLC layer of the plurality of logical channels corresponding to the bearer.

10. The buffer state reporting method according to claim 9, wherein the UE only reports the buffer data amount of one of the plurality of logical channels corresponding to the bearer for which the data packet duplication mode is configured/activated to the network side device.

11. The buffer state reporting method according to claim 1, wherein MAC sub-headers corresponding to the first BSR MAC CE, the second BSR MAC CE, and the third BSR MAC CE all carry a logical channel identifier (LCID) and/or length field indication information.

12. A method of processing a buffer state report, comprising:
receiving, by a network side device, buffer state information from a user equipment (UE), and buffer state information of a plurality of logical channels corresponding to a same bearer for which a data packet duplication mode is configured/activated being separately reported; and
scheduling, by the network side device, data of the plurality of logical channels corresponding to the same bearer for which the data packet duplication mode is configured/activated to different carriers respectively for transmission according to the buffer state information,
wherein the receiving, by the network side device, the buffer state information from the UE comprises:
receiving, by the network side device, buffer state information of all bearers for which buffer state reporting (BRS) is necessary from the UE by a first BSR Media Access Control Control Element (MAC CE); or
receiving, by the network side device, buffer state information of all bearers for which the BSR is necessary and the data packet duplication mode is not configured/activated from UE by a second BSR MAC CE, and receiving, by the network side device, buffer state information of all bearers for which the BSR is necessary and the data packet duplication mode is configured/activated from UE by a third BSR MAC CE,
wherein the receiving, by the network side device, buffer state information of all bearers for which the BRS is necessary from the UE by a first BSR MAC CE comprises:
receiving, by the network side device, buffer state information reported by the UE by taking a logical channel as a unit; or
receiving, by the network side device, buffer state information reported by the UE by taking a logical channel group as a unit; or
receiving, by the network side device, buffer state information of one part of logical channels reported by the UE by taking a logical channel as a unit, and buffer state information of the other parts of logical channels reported by the UE by taking a logical channel group as a unit, wherein a plurality of logical channels corresponding to a same bearer for which the data packet duplication mode is configured/activated belong to different logical channel groups.

13. The method according to claim 12, wherein the receiving, by the network side device, buffer state information from the UE by taking a logical channel as a unit comprises:
receiving, by the network side device, a buffer data amount of each logical channel reported by the UE by taking a logical channel as a unit, and the buffer data amount of each logical channel is a sum of a buffer data amount of a Packet Data Convergence Protocol (PDCP) layer and a buffer data amount of a Radio Link Control (RLC) layer corresponding to the logical channel; or
receiving, by the network side device, the buffer data amount of the PDCP layer and the buffer data amount of the RLC layer of each logical channel separately reported by the UE by taking a logical channel as a unit; or
for a logical channel corresponding to the bearer for which the data packet duplication mode is not configured/activated, receiving, by the network side device, the buffer data amount of each logical channel reported by the UE by taking a logical channel as a unit, and the buffer data amount of each logical channel being the sum of the buffer data amount of the PDCP layer and the buffer data amount of the RLC layer; for a plurality of logical channels corresponding to the bearer for which the data packet duplication mode is configured/activated, receiving, by the network side device, the buffer data amount of the PDCP layer and the buffer data amount of the RLC layer of each logical channel reported by the UE by taking a logical channel as a unit.

14. The method according to claim 12, wherein the receiving, by the network side device, the buffer state information reported by the UE by taking a logical channel group as a unit comprises:
receiving, by the network side device, the buffer data amount of each logical channel group reported by the UE by taking a logical channel group as a unit, wherein the plurality of logical channels corresponding to a same bearer for which the data packet duplication mode is configured/activated belong to different logical channel groups; or
receiving, by the network side device, the buffer data amount of each logical channel group reported by UE by taking a logical channel group as a unit, wherein logical channels corresponding to the bearer for which the data packet duplication mode is not configured/activated and logic channels corresponding the bearer for which the data packet duplication mode is configured/activated belong to different logical channel groups, and different logical channels corresponding to a same bearer for which the data packet duplication mode is configured/activated belong to different logic channel groups.

15. A user equipment (UE), comprising a processor, a memory, and one or more programs stored in the memory, wherein the processor is configured to read the one or more programs and perform the buffer state reporting method according to claim 1.

16. A network side device, comprising a processor, a memory, and one or more programs stored in the memory, wherein the processor is configured to read the one or more programs and perform the method according to claim 12.

17. A buffer state reporting method, comprising:
determining, by a user equipment (UE), whether a buffer state reporting triggering condition is met; and
reporting, by the UE, buffer state information to a network side device if the buffer state reporting triggering condition is met, wherein buffer state information of a plurality of logical channels corresponding to a same bearer for which a data packet duplication mode is configured/activated are reported separately,
wherein the reporting, by the UE, the buffer state information to the network side device comprises:
reporting, by the UE, buffer state information of all bearers for which the buffer state reporting (BSR) is necessary and corresponding to the UE to the network side device through a first BSR Media Access Control Control Element (MAC CE); or
reporting, by the UE, buffer state information of all bearers for which the BRS is necessary and the data packet duplication mode is not configured/activated to the network side device by using a second BSR MAC CE; and reporting, by the UE, buffer state information of all bearers for which the BRS is necessary and the data packet duplication mode is configured/activated to the network side device by using a third BSR MAC CE, wherein the reporting, by the UE, the buffer state information of the bearer for which the data packet duplication mode is configured/activated to the network side device by using the third BSR MAC CE, comprises:

reporting, by the UE, the buffer state information of the plurality of logical channels corresponding to the bearer for which the data packet duplication mode is configured/activated to the network side device by taking a logical channel and/or a logic channel group as a unit, wherein the plurality of logical channels corresponding to a same bearer for which the data packet duplication mode is configured/activated belong to different logical channel groups.

* * * * *